(12) United States Patent
Ghosh et al.

(10) Patent No.: US 11,887,465 B2
(45) Date of Patent: Jan. 30, 2024

(54) METHODS, SYSTEMS, AND COMPUTER PROGRAMS FOR ALARM HANDLING

(71) Applicant: Yokogawa Electric Corporation, Tokyo (JP)

(72) Inventors: Kaushik Ghosh, Singapore (SG); Gokula Krishnan Sivaprakasam, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 64 days.

(21) Appl. No.: 17/480,407

(22) Filed: Sep. 21, 2021

(65) Prior Publication Data
US 2022/0207988 A1 Jun. 30, 2022

(30) Foreign Application Priority Data
Dec. 28, 2020 (SG) .............................. 10202013108S

(51) Int. Cl.
*G08B 29/18* (2006.01)
*G05B 23/02* (2006.01)

(52) U.S. Cl.
CPC ......... *G08B 29/185* (2013.01); *G05B 23/027* (2013.01); *G05B 23/0227* (2013.01)

(58) Field of Classification Search
CPC . G08B 29/185; G05B 23/0227; G05B 23/027
See application file for complete search history.

(56) References Cited

U.S. PATENT DOCUMENTS

2019/0129395 A1* 5/2019 Niemiec ............ G05B 23/0235

OTHER PUBLICATIONS

"Alarm systems A guide to design, management and procurement," The Engineering Equipment and Materials Users' Association, 2013, Publication 191, Edition 3, 274 pages.
"Alarm Rationalization and Implementation," Rockwell Automation, Jun. 2017, PROCES-WP015B-EN-P, 14 pages [retrieved online from: literature.rockwellautomation.com/idc/groups/literature/documents/wp/proces-wp015_-en-p.pdf].
Bransby et al. "The Management of Alarm Systems," HMSO, 1998, Contract Research Report 166/1998, 242 pages.
Timms "Hazards Equal Trips or Alarms or Both," Process Safety and Environmental Protection, Jan. 2009, vol. 87, No. 1, pp. 3-13.
Wang et al. "An Overview of Industrial Alarm Systems: Main Causes for Alarm Overloading, Research Status, and Open Problems," IEEE Transactions on Automation Science and Engineering, Apr. 2016, vol. 13, No. 2, pp. 1045-1061.
Wang et al. "Online reduction of chattering alarms due to random noise and oscillation," Proceedings of the 19th World Congress the International Federation of Automatic Control, Aug. 24-29, 2014, 6 pages.

(Continued)

*Primary Examiner* — Hongmin Fan
(74) *Attorney, Agent, or Firm* — Sheridan Ross P.C.

(57) ABSTRACT

A method comprises identifying an alarm event pattern within a log of alarm events that occur within a process control system, determining that a current alarm event within the process control system belongs to the alarm event pattern, determining one or more actions for resolving the current alarm event based on the alarm event pattern, and implementing the one or more actions to resolve the current alarm event.

19 Claims, 33 Drawing Sheets

(56) References Cited

OTHER PUBLICATIONS

Wang et al. "An online method for detection and reduction of chattering alarms due to oscillation," Computers and Chemical Engineering, 2013, vol. 54, pp. 140-150.
"Management of Alarm Systems for the Process Industries," International Society of Automation, 2009, ANSI/ISA—18.2-2009, 82 pages.
Naghoosi et al. "Estimation of alarm chattering," Journal of Process Control, Oct. 2011, vol. 21, No. 9, pp. 1243-1249.
Rothenberg "Alarm Management for Process Control," Momentum Press, 2009, Chapter 1, pp. 1-45.
Wang et al. "An online method to remove chattering and repeating alarms based on alarm durations and intervals," Computers and Chemical Engineering, Aug. 2014, vol. 67, pp. 43-52 (Abstract only).
Wang et al. "Association rules mining based analysis of consequential alarm sequences in chemical process," Journal of Loss Prevention in the Process Industries, May 2016, vol. 41, pp. 178-185.
Yang et al. "Detection of Correlated Alarms Based on Similarity Coefficients of Binary Data," IEEE Transactions on Automation Science and Engineering, 2013, vol. 10, No. 4, pp. 1014-1025.

\* cited by examiner

Table 1

| KPIs | EEMUA | Oil-Gas | Petrochem | Power |
|---|---|---|---|---|
| Average Alarms/day | 144 | 1200 | 1500 | 2000 |
| Peak alarms/10 min | 10 | 220 | 180 | 350 |
| Average alarms/10 min | 1 | 6 | 9 | 8 |

Figure 1B

Table 2

|       | 1   | 2   | ... | $N_{unique}$ |
|-------|-----|-----|-----|--------------|
| 1     | 2   | 0   |     | 1            |
| 2     | 1   | 1   |     | 1            |
| ...   | ... | ... | ... | ...          |
| $N_c$ | 3   | 0   |     | 2            |

Figure 19

Table 3

|  | 1 | 2 | ... | $N_{unique}$ |
|---|---|---|---|---|
| 1 | 700 sec | 0 |  | 1200 sec |
| 2 | 650 sec | 1400 sec |  | -1050 sec |
| ... | ... | ... | ... | ... |
| $N_c$ | 720 sec | 0 |  | 1000 sec |

Figure 21

Table 4

|   | 1 | 2 | ... | $N_{unique}$ |
|---|---|---|---|---|
| 1 | 1May2019 8:15:09 | NULL | | 1May2019 17:36:08 |
| 2 | 3May2019 15:40:42 | 3May2019 16:20:11 | | 1May2019 17:36:08 |
| ... | ... | ... | ... | ... |
| $N_c$ | 8May 2019 19:12:15 | NULL | | 8May2019 18:50:39 |

Figure 22

Table 5

|  | 1 | 2 | ... | $N_{unique}$ |
|---|---|---|---|---|
| 1 | 2 | 0 |  | 0 |
| 2 | 1 | 1 |  | 1 |
| ... | ... | ... | ... | ... |
| $N_c$ | 3 | 0 |  | 2 |

Figure 23

Table 6

|   | 1 | 2 | ... | $N_{unique}$ |
|---|---|---|-----|--------------|
| 1 | 700 sec | 0 | | NULL |
| 2 | 650 sec | 1400 sec | | -1050 sec |
| ... | ... | ... | ... | ... |
| $N_c$ | 720 sec | 0 | | 1000 sec |

Figure 24

Table 7

| | 1 | 2 | ... | $N_{unique}$ |
|---|---|---|---|---|
| 1 | 1May2019 8:15:09 | NULL | | NULL |
| 2 | 3May2019 15:40:42 | 3May2019 16:20:11 | | 1May2019 17:36:08 |
| ... | ... | ... | ... | ... |
| $N_c$ | 8May 2019 19:12:15 | NULL | | 8May2019 18:50:39 |

Figure 25

METHODS, SYSTEMS, AND COMPUTER PROGRAMS FOR ALARM HANDLING

CROSS REFERENCE TO RELATED APPLICATIONS

This application claims the benefit of Singapore Patent Application No. 10202013108S, filed Dec. 28, 2020, the entire disclosure of which is incorporated herein by reference.

FIELD

At least one example embodiment relates to the field of industrial process control systems, and more specifically to methods, systems and computer programs for alarm handling, alarm prediction and/or alarm rationalization within industrial process control systems.

BACKGROUND

Industrial environments, for example environments for manufacturing, production, extraction, construction, or others, involve complex systems and devices, and equally complex workflows. Processing facilities within industrial environments, such as oil refineries and water treatment plants are invariably managed using process control systems. The process control systems may be configured to manage the functioning and operation of industrial equipment—including machinery, sensors, valve devices and/or actuators within the processing facility.

SUMMARY

At least one example embodiment relates to the field of industrial process control systems, and more specifically to methods, systems and computer programs for alarm handling, alarm prediction and alarm rationalization within industrial process control systems.

At least one example embodiment relates to the field of industrial process control systems, and more specifically to methods, systems and computer programs for alarm handling, alarm prediction and alarm rationalization within industrial process control systems.

At least one example embodiment provides a method for alarm handling within a process control system. The method comprises (i) detecting one or more alarm events based on state data received from at least one device within the process control system, (ii) responsive to a determination that the detected one or more alarm events matches a stored alarm event pattern (a) retrieving an alarm event pattern response associated with the matched alarm event pattern, wherein the alarm event pattern response identifies one or more alarm response events, and (b) generating a control signal for implementing one or more of the alarm response events.

The stored alarm event pattern may have been generated based on the steps of (i) retrieving a set of historical data comprising alarm and event log data, (ii) correlating, based on alarm and event log data within the retrieved set of historical data, a reference alarm event with at least one of (a) one or more co-occurring candidate alarm events, wherein a respective probability of co-occurrence of each of the one or more candidate alarm events with the reference alarm event, is determined to be more than or equal to a defined first threshold value, and (b) one or more operator actions, wherein a respective probability of co-occurrence of each of the one or more operator actions with the reference alarm event, is determined to be more than or equal to a defined second threshold value, and (iii) including within the stored alarm event pattern, an ordered sequence comprising the one or more co-occurring candidate alarm events or the one or more co-occurring operator actions, wherein the ordered sequence is generated based on a median time difference between a timestamp associated with the reference alarm event and a timestamp associated with the co-occurring candidate alarm event or co-occurring operator action.

In a method embodiment, the ordered sequence comprising the one or more co-occurring candidate alarm events or the one or more co-occurring operator actions, is additionally generated based on a Median Absolute Deviation from the determined median time difference for the co-occurring candidate alarm event or for the co-occurring operator action.

In another method embodiment, the step of correlating a reference alarm event with at least one of the one or more co-occurring candidate alarm events and the one or more operator actions is implemented based on alarm and event log data from a reduced set of historical data, wherein the reduced set of historical data is generated based on (i) identification of chattering alarm data within the retrieved set of historical data, and (ii) generating the reduced set of historical data to include alarm and event data from the retrieved set of historical data, other than the identified chattering alarm data.

In a particular embodiment of the method, the chattering alarm data includes (i) one or more alarm events having alarm gaps less than or equal to a predefined first duration, or (ii) one or more alarm events having an alarm life of less than or equal to a predefined second duration.

In another embodiment of the method, (i) the matched alarm event pattern comprises one or more alarm events having no corresponding co-occurring operator actions, and (ii) the retrieved alarm event pattern response associated with the matched alarm event pattern includes an alarm suppression process flow for the one or more alarm events having no corresponding co-occurring operator actions.

In a further method embodiment, a step of determining that an alarm event has no corresponding co-occurring operator actions comprises (i) determining one or more probabilities of co-occurrence of at least one detected operator action with the alarm event, and (ii) responsive to the determined one or more probabilities of co-occurrence being less than a predefined value, identifying the alarm event as an alarm event having no corresponding co-occurring operator actions.

In a method embodiment, (i) the matched alarm event pattern comprises one or more alarm events having a corresponding set of co-occurring operator actions, and (ii) the retrieved alarm event pattern response associated with the matched alarm event pattern includes initiating a control signal to present a standardized set of operator actions to an operator in response to detection of the one or more alarm events or in response to detection of the matched alarm event pattern, wherein the standardized set of operator actions comprises the corresponding set of co-occurring operator actions.

According to another embodiment of the method, determining that an alarm event has a corresponding set of co-occurring operator actions, comprises (i) determining one or more probabilities of co-occurrence of one or more operator actions with the alarm event, (ii) responsive to the determined one or more probabilities of co-occurrence being greater than a predefined value, identifying the one or more operator actions as co-occurring operator actions that co-occur with the alarm event; (iii) identifying timestamps associated with each of the one or more co-occurring operator actions, and (iv) ordering each of the plurality of co-occurring operator actions in a sequence, wherein the position of a co-occurring operator action within the sequence is determined based on a median time difference between a timestamp associated with the co-occurring operator action and a timestamp associated with the alarm event.

In one method embodiment, the position of a co-occurring operator action within the sequence is additionally determined based on a Median Absolute Deviation from the determined median time difference for the co-occurring operator action.

The method may include an embodiment wherein (i) the matched alarm event pattern comprises a cluster of redundant alarm events, and (ii) the retrieved alarm event pattern response associated with the matched alarm event pattern includes initiating an alarm suppression process flow for one or more alarm events within the cluster of redundant alarm events.

The method may additionally include an embodiment, wherein the matched alarm event pattern is generated by (i) determining one or more probabilities of co-occurrence of at least one candidate alarm event with a reference alarm event, (ii) responsive to the determined one or more probabilities of co-occurrence being greater than a predefined value, identifying the candidate alarm event as a co-occurring alarm event that co-occurs with the reference alarm event, (iii) generating a cluster of alarm events comprising the reference alarm event and the identified one or more co-occurring alarm events, (iv) identifying timestamps associated with each of the plurality of alarm events within the generated cluster of alarm events, and (v) ordering each of the plurality of alarm events within the generated cluster of alarm events in a sequence, wherein the position of an alarm event that is sought to be ordered within the sequence is determined based on a median time difference between a timestamp associated with the reference alarm event and a timestamp associated with a candidate alarm event within the cluster of alarm events.

In an embodiment of the method, the position of a candidate alarm event within the sequence is additionally determined based on a Median Absolute Deviation from the determined median time difference for the candidate alarm event.

The method may include an embodiment wherein identifying redundant alarm events for grouping within the cluster of redundant alarm events includes (i) identifying a cluster of alarm events occurring in sequence, (ii) determining a time of occurrence of each alarm event within the identified cluster, and (iii) responding to a determination that a time of occurrence of each alarm event within the cluster is separated from an earlier alarm event within the cluster by less than a defined time value, by identifying the cluster of alarm events as a cluster of redundant alarm events.

In another embodiment of the method, (i) the matched alarm event pattern comprises a cluster of consequential alarm events, and (ii) the retrieved alarm event pattern response associated with the matched alarm event pattern includes initiating an alarm prediction process flow comprising responding to detection of an occurring instance of one or more precursor alarm events within the cluster of consequential alarm events, by presenting to an operator, information predicting a future occurrence of one or more instances of successor alarm events within said cluster of consequential alarm events, prior to said instances of the successor alarm events being detected.

In a further embodiment of the method, the cluster of consequential alarm events is generated based on the steps of (i) identifying timestamps associated with each of a plurality of consequential alarm events, and (ii) ordering each of the plurality of consequential alarm events within a sequence, wherein the position of a candidate alarm event that is sought to be ordered within the sequence is determined based on a median time difference between a timestamp associated with a reference alarm event within the plurality of consequential alarm events and a timestamp associated with the candidate alarm event.

In a particular embodiment of the method, the position of a candidate alarm event within the sequence is additionally determined based on a Median Absolute Deviation from the determined median time difference for the candidate alarm event.

In an further embodiment of the method, identifying consequential alarm events for grouping within the cluster of consequential alarm events includes (i) identifying a cluster of alarm events that occur in sequence, (ii) determining a time of occurrence of each alarm event within the identified cluster of sequentially occurring alarm events, and (iii) responding to a determination that a time of occurrence associated with one or more (or preferably each) alarm events within the identified cluster of sequentially occurring alarm events, is separated from an earlier alarm event within the identified cluster of sequentially occurring alarm events by more than a defined duration, by identifying the cluster of sequentially occurring alarm events as a cluster of consequential alarm events.

At least one example embodiment also provides a system for alarm handling within a process control system. The system may comprise a processor implemented server configured for (i) detecting one or more alarm events based on state data received from at least one device within the process control system, (ii) responsive to a determination that the detected one or more alarm events matches a stored alarm event pattern (a) retrieving an alarm event pattern response associated with the matched alarm event pattern, wherein the alarm event pattern response identifies one or more alarm response events, and (b) generating a control signal for implementing one or more of the alarm response events.

The system may be configured such that the stored alarm event pattern has been generated based on the steps of (i) retrieving a set of historical data comprising alarm and event log data, (ii) correlating, based on alarm and event log data within the retrieved set of historical data, a reference alarm event with at least one of (a) one or more co-occurring candidate alarm events, wherein a respective probability of co-occurrence of each of the one or more candidate alarm events with the reference alarm event, is determined to be more than or equal to a defined first threshold value, and (b) one or more operator actions, wherein a respective probability of co-occurrence of each of the one or more operator actions with the reference alarm event, is determined to be more than or equal to a defined second threshold value, and (iii) including within the stored alarm event pattern, an ordered sequence comprising the one or more co-occurring candidate alarm events or the one or more co-occurring operator actions, wherein the ordered sequence is generated based on a median time difference between a timestamp associated with the reference alarm event and a timestamp associated with the co-occurring candidate alarm event or co-occurring operator action.

The system may be configured such that the ordered sequence comprising the one or more co-occurring candidate alarm events or the one or more co-occurring operator actions, is additionally generated based on a Median Absolute Deviation from the determined median time difference for the co-occurring candidate alarm event or for the co-occurring operator action.

In an embodiment, the system may be configured such that the step of correlating a reference alarm event with at least one of the one or more co-occurring candidate alarm events and the one or more operator actions is implemented based on alarm and event log data from a reduced set of historical data, wherein the reduced set of historical data is generated based on (i) identification of chattering alarm data within the retrieved set of historical data, and (ii) generating the reduced set of historical data to include alarm and event data from the retrieved set of historical data, other than the identified chattering alarm data.

In another embodiment, the system may be configured such that the chattering alarm data includes (i) one or more alarm events having alarm gaps less than or equal to a predefined first duration, or (ii) one or more alarm events having an alarm life of less than or equal to a predefined second duration.

The system may in a specific embodiment be configured such that (i) the matched alarm event pattern comprises one or more alarm events having no corresponding co-occurring operator actions, and (ii) the retrieved alarm event pattern response associated with the matched alarm event pattern includes an alarm suppression process flow for the one or more alarm events having no corresponding co-occurring operator actions.

The system may additionally be configured such that a step of determining that an alarm event has no corresponding co-occurring operator actions comprises (i) determining one or more probabilities of co-occurrence of at least one detected operator action with the alarm event, and (ii) responsive to the determined one or more probabilities of co-occurrence being less than a predefined value, identifying the alarm event as an alarm event having no corresponding operator actions.

The system may be configured such that (i) the matched alarm event pattern comprises one or more alarm events having a corresponding set of co-occurring operator actions, and (ii) the retrieved alarm event pattern response associated with the matched alarm event pattern includes initiating a control signal to present a standardized set of operator actions to an operator in response to detection of the one or more alarm events or in response to detection of the matched alarm event pattern, wherein the standardized set of operator actions comprises the corresponding set of co-occurring operator actions.

In an embodiment, the system may be configured such that determining that an alarm event has a corresponding set of co-occurring operator actions, comprises (i) determining one or more probabilities of co-occurrence of one or more operator actions with the alarm event, (ii) responsive to the determined one or more probabilities of co-occurrence being greater than a predefined value, identifying the one or more operator actions as co-occurring operator actions that co-occur with the alarm event, (iii) identifying timestamps associated with each of the one or more co-occurring operator actions, and (iv) ordering each of the plurality of co-occurring operator actions in a sequence, wherein the position of a co-occurring operator action within the sequence is determined based on a median time difference between a timestamp associated with the co-occurring operator action and a timestamp associated with the alarm event.

The system may be configured such that the position of a co-occurring operator action within the sequence is additionally determined based on a Median Absolute Deviation from the determined median time difference for the co-occurring operator action.

In an embodiment, the system may be configured such that (i) the matched alarm event pattern comprises a cluster of redundant alarm events, and (ii) the retrieved alarm event pattern response associated with the matched alarm event pattern includes initiating an alarm suppression process flow for one or more alarm events within the cluster of redundant alarm events.

The system may in a further embodiment be configured such that the matched alarm event pattern is generated by (i) determining one or more probabilities of co-occurrence of at least one candidate alarm event with a reference alarm event, (ii) responsive to the determined one or more probabilities of co-occurrence being greater than a predefined value, identifying the candidate alarm event as a co-occurring alarm event that co-occurs with the reference alarm event, (iii) generating a cluster of alarm events comprising the reference alarm event and the identified one or more co-occurring alarm events, (iv) identifying timestamps associated with each of the plurality of alarm events within the generated cluster of alarm events, and (v) ordering each of the plurality of alarm events within the generated cluster of alarm events in a sequence, wherein the position of an alarm event that is sought to be ordered within the sequence is determined based on a median time difference between a timestamp associated with the reference alarm event and a timestamp associated with a candidate alarm event within the cluster of alarm events.

The system may be configured such that the position of a candidate alarm event within the sequence is additionally determined based on a Median Absolute Deviation from the determined median time difference for the candidate alarm event.

In an embodiment, the system may be configured such that identifying redundant alarm events for grouping within the cluster of redundant alarm events includes (i) identifying a cluster of alarm events occurring in sequence, (ii) determining a time of occurrence of each alarm event within the identified cluster, and (iii) responding to a determination that a time of occurrence of each alarm event within the cluster is separated from an earlier alarm event within the cluster by less than a defined time value, by identifying the cluster of alarm events as a cluster of redundant alarm events.

In another embodiment, the system may be configured such that (i) the matched alarm event pattern comprises a cluster of consequential alarm events, and (ii) the retrieved alarm event pattern response associated with the matched alarm event pattern includes initiating an alarm prediction process flow comprising responding to detection of an occurring instance of one or more precursor alarm events within the cluster of consequential alarm events, by presenting to an operator, information predicting a future occurrence of one or more instances of successor alarm events within said cluster of consequential alarm events, prior to said instances of the successor alarm events being detected.

The system may in a specific embodiment be configured such that the cluster of consequential alarm events is generated based on the steps of (i) identifying timestamps associated with each of a plurality of consequential alarm events, and (ii) ordering each of the plurality of consequential alarm events within a sequence, wherein the position of a candidate alarm event that is sought to be ordered within the sequence is determined based on a median time difference between a timestamp associated with a reference alarm event within the plurality of consequential alarm events and a timestamp associated with the candidate alarm event.

The system may be configured such that the position of a candidate alarm event within the sequence is additionally determined based on a Median Absolute Deviation from the determined median time difference for the candidate alarm event.

In a particular embodiment, the system may be configured such that identifying consequential alarm events for grouping within the cluster of consequential alarm events includes (i) identifying a cluster of alarm events that occur in sequence, (ii) determining a time of occurrence of each alarm event within the identified cluster of sequentially occurring alarm events, and (iii) responding to a determination that a time of occurrence associated with one or more (or preferably each) alarm events within the identified cluster of sequentially occurring alarm events, is separated from an earlier alarm event within the identified cluster of sequentially occurring alarm events by more than a defined duration, by identifying the cluster of sequentially occurring alarm events as a cluster of consequential alarm events.

At least one example embodiment additionally provides a computer program product for alarm handling within a process control system. The computer program product may comprise a non-transitory computer usable medium having a computer readable program code embodied therein, the computer readable program code comprising instructions for implementing within a processor based computing system, the steps of (i) detecting one or more alarm events based on state data received from at least one device within the process control system, (ii) responsive to a determination that the detected one or more alarm events matches a stored alarm event pattern (a) retrieving an alarm event pattern response associated with the matched alarm event pattern, wherein the alarm event pattern response identifies one or more alarm response events, and (b) generating a control signal for implementing one or more of the alarm response events.

In an embodiment of the computer program product, the stored alarm event pattern may be generated based on the steps of retrieving a set of historical data comprising alarm and event log data, (ii) correlating, based on alarm and event log data within the retrieved set of historical data, a reference alarm event with at least one of (a) one or more co-occurring candidate alarm events, wherein a respective probability of co-occurrence of each of the one or more candidate alarm events with the reference alarm event, is determined to be more than or equal to a defined first threshold value, and (b) one or more operator actions, wherein a respective probability of co-occurrence of each of the one or more operator actions with the reference alarm event, is determined to be more than or equal to a defined second threshold value, and (iii) including within the stored alarm event pattern, an ordered sequence comprising the one or more co-occurring candidate alarm events or the one or more co-occurring operator actions, wherein the ordered sequence is generated based on a median time difference between a timestamp associated with the reference alarm event and a timestamp associated with the co-occurring candidate alarm event or co-occurring operator action.

BRIEF DESCRIPTION OF THE ACCOMPANYING DRAWINGS

FIG. 1B is a comparison of Alarm System KPIs across various industries in comparison with benchmarks set by the EEMUA.

FIG. 19 illustrates an exemplary first matrix used for storing data corresponding to occurrences of alarm events within a specific time window.

FIG. 21 illustrates a second matrix used for storing time difference data, when there are multiple occurrences of a second alarm event within a time window associated with a first alarm event.

FIG. 22 illustrates a third matrix used for storing time stamp data in accordance with the teachings of at least one example embodiment.

Figure 23:
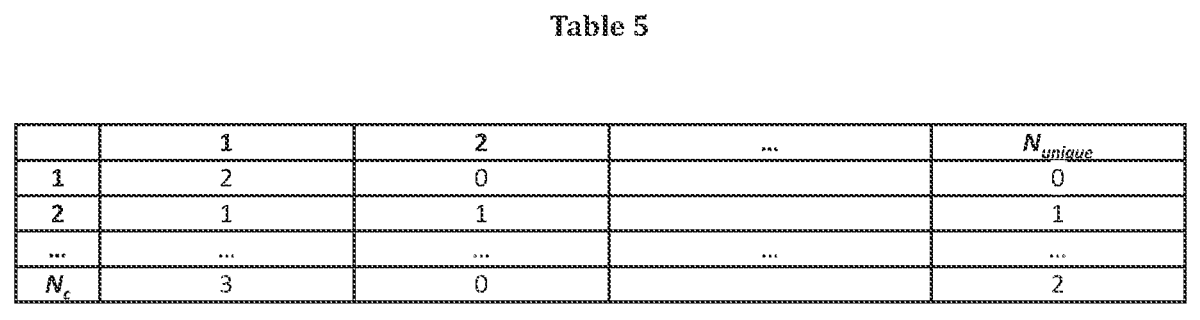

FIG. 23 illustrates a modified first matrix in accordance with the teachings of at least one example embodiment.

FIG. 24 illustrates an updated second matrix in accordance with the teachings of at least one example embodiment.

FIG. 25 illustrates a fourth matrix comprising a binary matrix generated based on the updated second matrix of FIG. 24, in accordance with the teachings of at least one example embodiment.

DETAILED DESCRIPTION

Figure 1A:
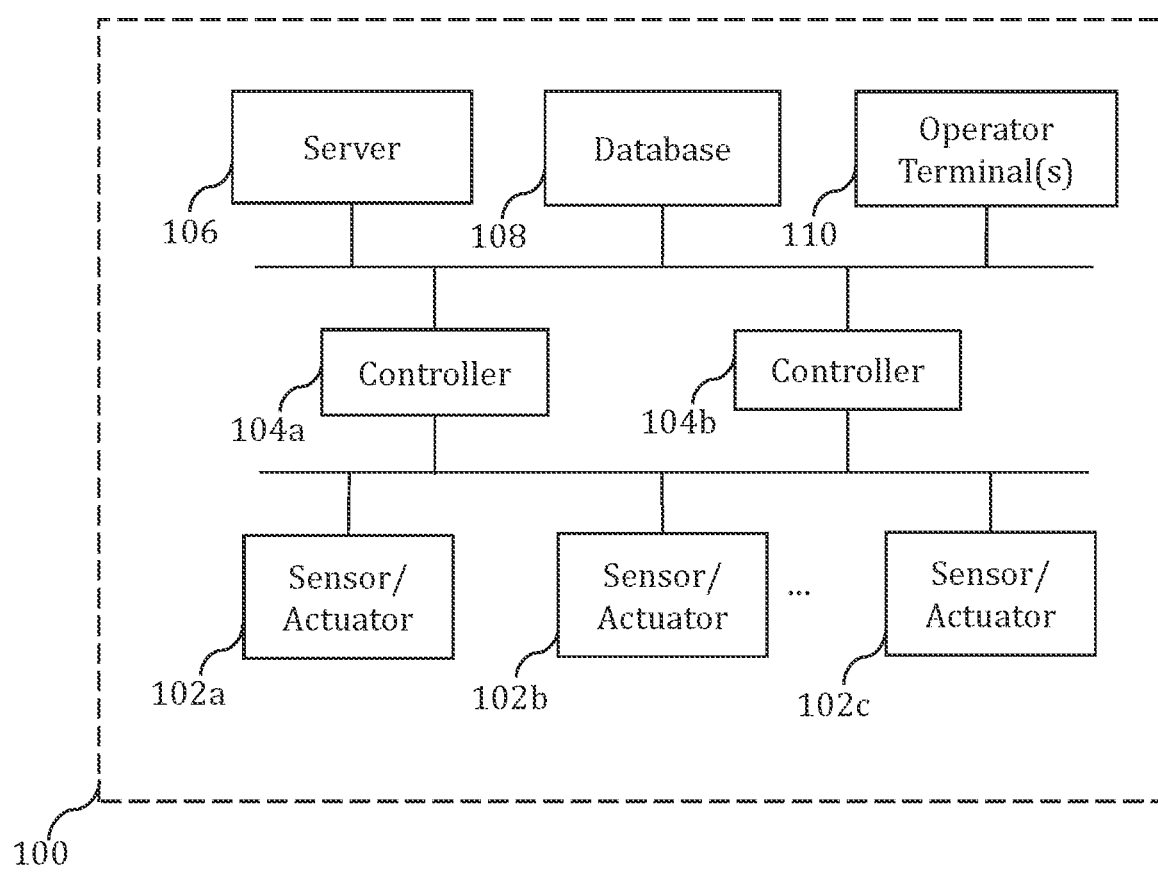
FIG. 1A illustrates an exemplary process control system of a kind that may be used to manage a processing facility/industrial environment.

FIG. 1 illustrates an exemplary process control system 100 of a kind that may be used to manage an industrial environment. Process control system 100 comprises a plurality of sensors, valve devices or actuators 102a, 102b, 102c. The sensors, valve devices and/or actuators represent components that may perform any of a wide variety of functions. For example, sensors may measure parameters or characteristics of the industrial environment—e.g. temperature, pressure, flow rate. Valve devices are used to regulate and/or direct the flow of a fluid. Likewise, actuators can perform a wide variety of operations that alter states of the industrial environment or that alter the parameters/characteristics being monitored by the sensors. For example, the actuators may represent electrical motors, hydraulic cylinders, and/or transducers.

The one or more sensors/valve devices/actuators 102a to 102c are connected to controllers 104a, 104b through a field network that facilitates interaction between devices connected thereto (e.g. an Ethernet network, an electrical signal network, such as a HART or FOUNDATION FIELDBUS network, a pneumatic control signal network, or any other or additional type(s) of network(s)). Controllers 104a, 104b may comprise one or more hardware controllers that use parameter data received from one or more sensors, or from an operator or a server, to control the operation of one or more actuators.

The process control system 100 may additionally include a server 106 configured to perform functions necessary to support operation and control of the controllers 104a, 104b. Exemplary functions of server 106 may include logging information collected or generated by the controllers 104a, 104b, and executing applications that control the operations of the controllers 104a, 104b and thereby controlling the operation of the sensors, valve devices and/or actuators 102a to 102c. Server 106 may additionally provide secure access to the controllers 104a, 104b, and/or sensors or valve devices or actuators 102a to 102c.

Process control system 100 also includes a database 108 configured to store information received from one or more of server 106, controllers 104a, 104b and/or sensors or valve devices or actuators 102a to 102c. Further, process control system 100 includes one or more operator terminals 110, each comprising a processor implemented network communication enabled data processing device that provides operators with access to server 106, to controllers 104a, 104b and/or sensors or valve devices or actuators 102a to 102c. Each operator terminal 110 may be configured to receive data inputs and/or control instructions from an operator, receive and display warnings, alerts, alarms or other messages or displays generated by the server 106, controllers 104a, 104b and/or sensors or valve devices or actuators 102a to 102c.

Process control systems, of the type illustrated in FIG. 1A, may implement an alarm system that is used to generate alarms in response to detection of problems or deviations from prescribed process parameters. Alarm systems are defined within the industrial standard ANSI/ISA-18.2 [1, p. 16], in the following manner—"an alarm system is the collection of hardware and software that detects an alarm state, communicates the indication of that state to operators, and records changes in the alarm state." Alarm systems constitute integral parts of modern process control systems, such as the Distributed Control Systems (DCS) and Supervisory Control and Data Acquisition (SCADA) systems, and play a crucial role for safe and efficient operations of modern industrial plants such as petroleum refineries, chemical, petrochemical, power, and water treatment plants. The main purpose of an alarm system is to promptly indicate the occurrences of any abnormal condition, so that operators can take remedial actions to bring a process back to its normal operating regions. A problem common to some industrial alarm systems is that such systems tend to generate far more alarms that operators can effectively handle. This problem is known as alarm overloading or alarm flooding—and is typically the result of a poorly configured or defectively functioning alarm system. The extent of the problem is indicated in Table 1 as shown in FIG. 1B, which shows statistics of 3 Key Performance Indices (KPIs) of alarms systems, based on a study of 39 industrial plants ranging from oil and gas, petrochemical, power and other industries.

The corresponding benchmark values according to the relevant EEMUA-191 guideline (The Engineering Equipment and Materials Users' Association), are also presented in Table 1 for comparison. It will be noted that the compiled statistics of KPIs from various industries significantly exceed the EEMUA benchmarks.

The incidence of alarm overloading can be understood by classifying alarms into two groups—(i) nuisance alarms, and (ii) true (real) alarms. A nuisance alarm does not affect the process and hence does not require any specific response or action from operators. According to the industrial standard ANSI/ISA-18.2 [1, p. 18] an alarm must indicate an equipment malfunction, process deviation or abnormal condition requiring a response. A real alarm on the other hand, must indicate an abnormal situation that requires operator to pay attention or to take action in a timely manner to prevent the abnormal situation associated with the real alarm from having an adverse effect on the process safety and/or efficiency. Nuisance alarms are a major contributor for the phenomenon of alarm overloading.

It would be readily understood that alarm overloading is detrimental to the role played by alarm systems. A large number of alarms generated by the alarm systems are difficult to address meaningfully. They do not provide any useful information and distract the plant operators. Ineffective management of nuisance alarms may lead to incidents and pose an increased risk of fatigue and stress for operators, who are required to make instant decisions on how to respond when an alarm occurs. On the other hand, the real (true) alarms are often buried within a large number of nuisance alarms and may be overlooked by operators. As a result, operators may erroneously pay attention to less important alarms/nuisance alarms, or may not pay attention to the entire alarm system. As a result, true alarms which require operator actions to rectify an abnormal process state may be ignored, and the necessary corrective actions may be overlooked.

Alarm handling and alarm rationalization refer to processes for addressing some of these problems. Some processes for alarm rationalization involve a cross-functional team of plant stakeholders reviewing, justifying, and documenting whether each alarm configured within an alarm system or a process control system meets the criteria for being an alarm (i.e., the alarm must be relevant and useful, must indicate an abnormal situation and must require necessary corrective actions by an operator). The principal objective of alarm rationalization is to minimize alarm load on operators by presenting only true alarms that are relevant and require operator actions. Another objective of alarm rationalization is to suppress nuisance alarms, or other alarms that do not qualify as true alarms—so as to enable operators to focus on alarms that actually require attention and remedial actions.

Alarm rationalization may include defining the attributes of each alarm (such as limit, priority, classification, and type), and documenting the causes and consequences, response time, and operator action. The alarm rationalization process is typically implemented manually. It is tedious, time consuming and requires significant manual efforts. Since there are thousands of alarms configured in an alarm system, it is often difficult to identify appropriate candidate alarm events for review/examination during the alarm rationalization.

There is accordingly a need for solutions that enable automated alarm rationalization by accurately identifying nuisance alarms for suppression, grouping, removal and for handling true alarms. There is also a need for predictive alarm handling to provide operators with advance notification of alarm states that are likely to give rise to one or more future true alarms within a defined time window—so that an operator may take advance actions to rectify or to entirely avoid the causative event corresponding to the predicted alarm state.

At least one example embodiment provides methods, systems and computer programs for alarm handling, alarm prediction and/or alarm rationalization within industrial process control systems. Certain embodiments provide solutions that enable automated alarm rationalization for accurately identifying nuisance alarms for suppression or other appropriate actions, and for handling true alarms. At least one example embodiment additionally provides predictive alarm handling to provide operators with advance notification of alarm states that are likely to give rise to one or more future true alarms within a defined time window—so that an operator may take advance actions to rectify or to entirely avoid the causative event or state corresponding to the predicted true alarm.

Unlike other solutions for alarm rationalization and/or alarm handling—which focus exclusively on alarm counts (i.e. the number of alarm occurrences) and on alarm duration (i.e. the time gap between alarm activation and recovery) of individual alarms—at least one example embodiment focuses on discovering correlations and patterns among a large volume of alarm events, and using these discovered correlations and patterns for alarm handling activities, including but not limited to alarm suppression, alarm grouping, alarm removal, alarm prediction, and standardization of alarm response procedures. As a result, example embodiments may have the technical effect of reducing resources used (e.g., computer processing power and/or manual power) to detect and resolve alarms within a process environment.

For the purposes of the description, the terms "alarm(s)" and "alarm event(s) are used interchangeably to describe an alert, message, or communication that is generated in response to detection of an alarm state, i.e. deviation from normal operating conditions. The term "alarm state" may be understood as a process state, component state, device state or environment state that falls outside a set of process states, component states, device states or environment states that have been defined as normal states or acceptable states for an industrial environment.

Figure 2:
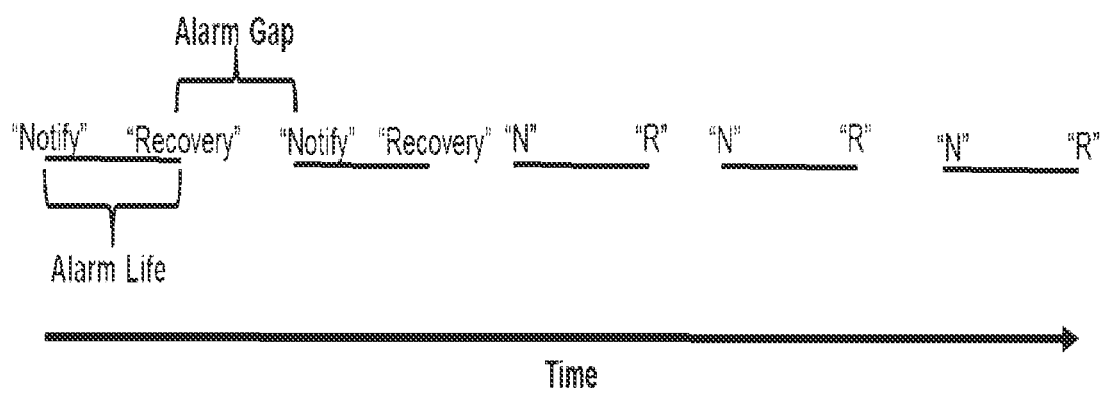
FIG. 2 is an illustration of "alarm life" and "alarm gap" as understood in connection with an alarm system.

Additionally, the terms "alarm life" and "alarm gap" shall be understood in accordance with the illustration of FIG. 2. As shown in FIG. 2, the term "alarm life" may be understood as the time difference between an alarm notification event (i.e. when the alarm is activated/commenced) and an alarm recovery event (i.e. when the alarm returns to normal). The term "alarm gap" may be understood as the time difference between an alarm recovery event and the next alarm notification event for the same alarm.

The following description relies on references to various different types of alarms or alarm events, including true alarms, chattering alarms, redundant alarms, and consequential alarms, each of which is described briefly below.

As discussed above, a true alarm is an alarm event that is generated in response to detection of an abnormal state that requires an operator to pay attention or to take action in a timely manner to prevent a detected abnormal process state, component state, device state or environment state from having an adverse effect on process safety and/or efficiency.

Chattering alarms are among the most widely encountered nuisance alarms, and are generally found to contribute to about 10%-60% of alarm counts within an industrial environment. As per industrial standard ANSI/ISA-18.2, a "chattering alarm" can be defined as one that repeatedly transitions between an alarm state and a normal state within a short period of time. As a result, chattering alarms provide little or no time for operators to analyze such alarms and take remedial steps.

Chattering alarms include two closely related alarm types—namely, fleeting alarms and repeating alarms. Fleeting alarms comprise alarm events having a short alarm life or alarm duration, and do not immediately repeat. Repeating alarms on the other hand repeat almost immediately after recovery, but do not necessarily have a short alarm life. Chattering alarms of either kind are usually or often triggered due to random noise and/or disturbances detected in connection with process variables, especially when the process variables are operating closely to their alarm limits.

Figure 3:
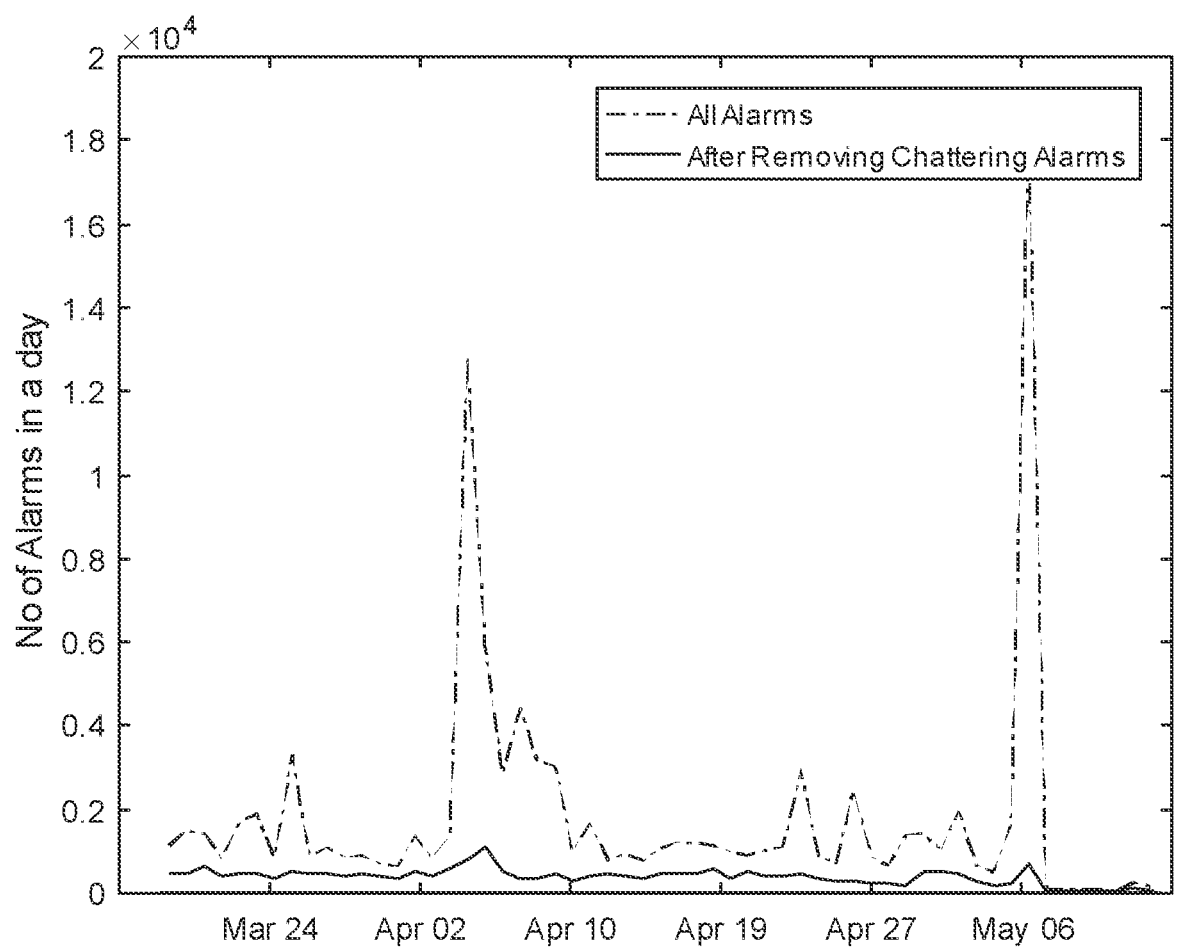
FIG. 3 is a graph illustrating the effects of chattering alarm identification and removal within an alarm system.

FIG. 3 is a graph illustrating the effects of chattering alarm identification and removal within an alarm system. The data in the FIG. 3 graph was generated based on historical alarm and event (A&E) data from a water treatment plant, which was found to suffer from alarm overloading, and there were about 77 alarm occurrences per hour. It was found that identified chattering alarms (including fleeting and repeating alarms) contributed to more than 81% of total alarm count. Prior to alarm rationalization, the alarm and event (A&E) data included a total alarm count of 107,324 alarm events across 58 days, with an average alarm rate of 77.10 per hour, and an average alarm rate of 12.85 per ten minutes. After identifying and removing the chattering alarms, the alarm and event data was found to include a total alarm count of 19,925 across 58 days, with an average per hour alarm rate of 14.31 per hour, and an average per ten minute alarm rate of 2.39. Stated differently, nuisance alarms were found to comprise approximately 81% of the total number of alarm events across the studied 58-day period.

Redundant alarms and consequential alarms are two other alarm types that contribute significantly to nuisance alarms.

"Redundant alarms" can be defined as a group of alarm events that often occur together within a short period of time, typically within a few minutes. Since all the alarm events in a redundant alarm group occur within a very short period of time, it is not possible for an operator to respond to each and every alarm event in the redundant alarm group. Further, all alarms events in a redundant alarm group are triggered by the same root cause. Hence, all of them essentially indicate the same underlying problem and do not necessarily require different corrective actions by operators. Incorrectly configured alarm variables are often the main reason for redundant alarms. Equally often, many variables are configured to trigger alarm events without a careful study on the necessity of linking alarm events to such variables, or on the alarm ranges. In prior studies, up to 50% of configured alarm variables have been found to be redundant alarms that were capable of being removed through alarm rationalization.

"Consequential alarms" on the other hand, are a group of alarm events that occur one after another in a sequential manner with a significant time difference (for example, 5 minutes of more) between individual alarm events. Since the time difference between individual alarm events in a consequential alarm group is usually more than 5 minutes, it is possible for operators to take necessary remedial actions in a timely manner upon occurrence of one or more precursor alarm event(s) in an alarm sequence, so that the remedial actions may prevent occurrence of the one or more successor alarm event(s) in the consequential alarm sequence.

Consequential alarms are generally proven to occur due to propagation of abnormalities owing to physical connections. A large-scale industrial process is usually composed of upstream and downstream devices, which are physically connected. An abnormal condition in one process unit is very likely to be propagated to the downstream devices or the upstream devices owing to automatic control loops or recycling connections. As a result, as the abnormality propagates, a sequence of alarms may arise over a period of time from the process variables associated with the devices configured with alarms.

Figure 4A:
FIG. 4A is an explanatory illustration corresponding to alarms that do not trigger relevant operator action.

In addition to the above, there are two other alarm types that have been found to be useful for the purposes of inventive concepts. The first kind, as illustrated in FIG. 4A, are alarm events which do not require any relevant operator action to bring them back to a normal state. Such alarms can be considered part of the larger category of nuisance alarms, i.e. alarms with no relevant operator actions, which neither affect the process nor indicate any abnormal situations.

Figure 4B:
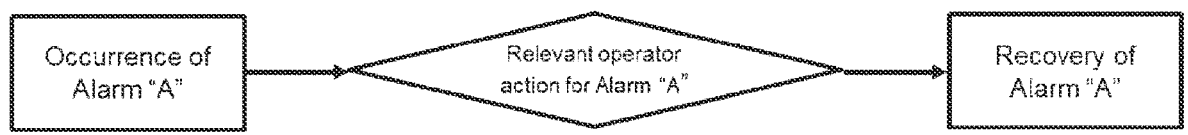
FIG. 4B is an explanatory illustration corresponding to alarm events that have historically triggered relevant operator action.

The other category of alarms, of the kind illustrated in FIG. 4B, are alarms which are historically shown to prompt one or more operator actions to bring the corresponding process state, component state, device state or environmental state, back to a normal state. Stated differently, when this kind of alarms occur, operators are supposed to take a defined set of corrective actions in a timely manner in order to normalize them. The fact that operators respond to such alarms on a regular basis with well-defined and consistent sets of actions, indicates that these alarms events are important, and are therefore true alarms.

Figure 5A:
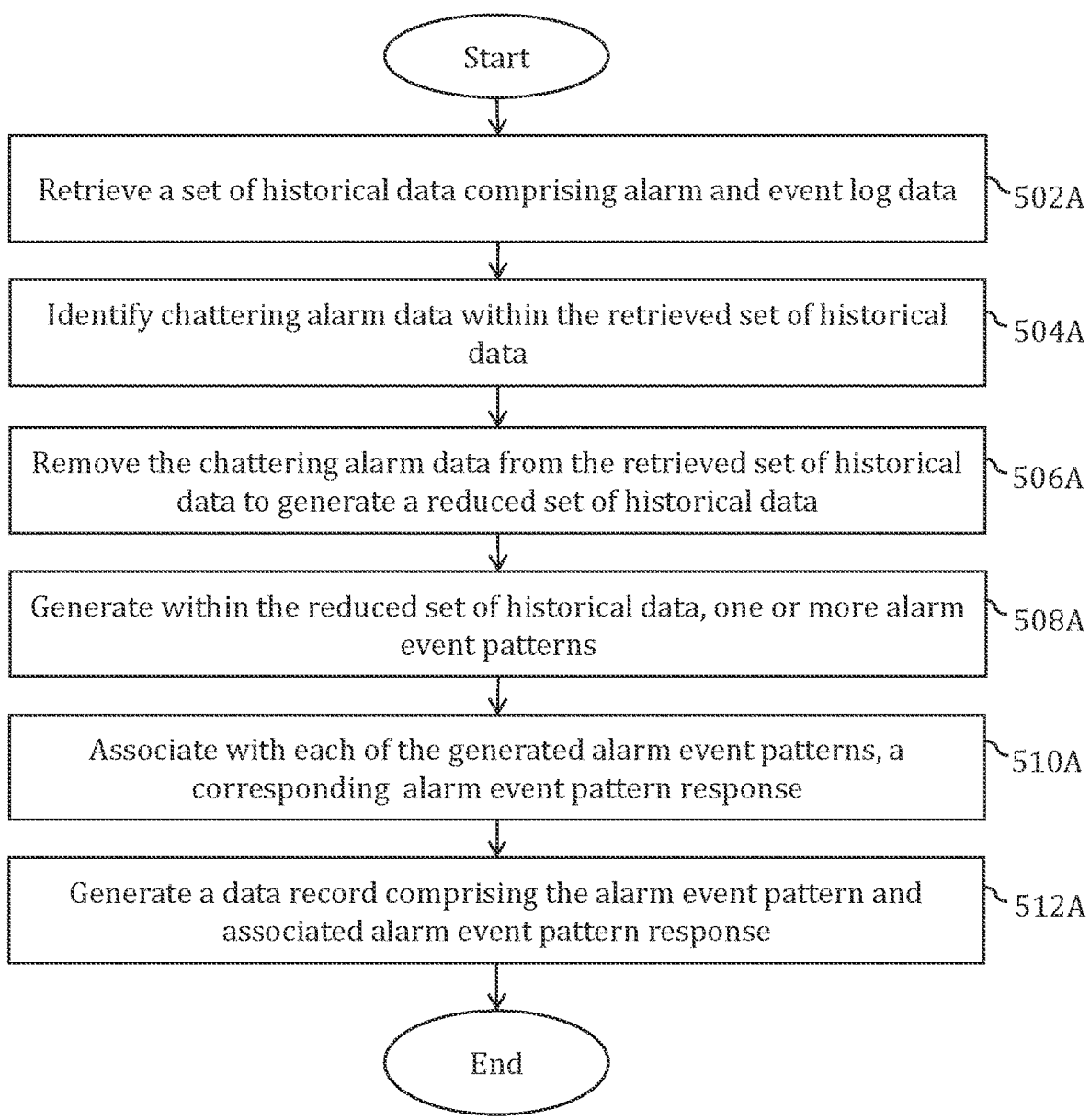
FIG. 5A is a flowchart illustrating a method of automated alarm rationalization in accordance with the teachings of at least one example embodiment.

FIG. 5A is a flowchart illustrating a method of automated alarm rationalization in accordance with the teachings of at least one example embodiment. In an embodiment, the method of FIG. 5A may be implemented within an alarm system, or a process control system, or a server within an alarm system or a process control system.

Step 502A comprises retrieving a set of historical data comprising alarm and event (A&E) log data. The set of historical data may be retrieved by the server 106 from a database 108 within the process control system. The alarm and event log data may include data corresponding to any of (i) one or more process, component or device states that have triggered an alarm event, (ii) the alarm event(s) themselves—e.g. the data relating to the type of alarm event, cause of alarm event, alarm event occurrence time, alarm recovery time, duration of alarm event, cause of alarm recovery, etc., and (iii) one or more operator actions initiated in connection with the alarm event(s)—for example, operator actions initiated for effecting an alarm recovery. The alarm and event log data may be extracted from one or more alarm logs, event logs and/or alarm and event logs that are generated and stored by a process control system within database 108.

Step 504A comprises identifying chattering alarm data within the retrieved set of historical data. Chattering alarm data may be identified in any number of different ways that would be apparent to a skilled person in the field. Exemplary embodiments of steps for identifying chattering alarm data are discussed subsequently in connection with FIG. 6.

Step 506A comprises removing, excluding or eliminating the identified chattering alarm data from the retrieved set of historical data to generate a reduced set of historical data that includes alarm and event data from the retrieved set of historical data other than the identified chattering alarm data.

Subsequently step 508A comprises generating based on the reduced set of historical data, a plurality of alarm event patterns. The alarm event patterns may be generated in accordance with several different methods—embodiments whereof are discussed subsequently. The chronology of steps 504A to 508A has been proven to be important to the effectiveness of the step of identifying a plurality of alarm event patterns i.e. prior removal of chattering alarm data through step 504A and/or step 506A has been found to significantly improve the accuracy of subsequently identifying alarm event patterns at step 508A. The reason is that chattering alarms are considered as 'noise' in alarm and event log data, and the removal of such chattering alarms could help to identify the alarm event patterns of true alarms in the log data.

Step 510A comprises associating with each of the identified alarm event patterns, a corresponding alarm event pattern response. An alarm event pattern response may comprise a set or a sequence of instructions, actions or steps that are intended to be implemented in response to future detection of an alarm event pattern that has been associated with an alarm event pattern response. Exemplary alarm event pattern responses may include, any of (i) generating an alarm, an alert or a notification corresponding to each alarm event within the detected alarm event pattern, (ii) suppressing or removing one or more alarm events within the detected alarm event pattern, and generating an alarm, an alert or a notification corresponding to one or more other alarm events within the detected alarm event pattern, (iii) presenting an operator with a standardized operating procedure, a standardized guidance, or other instructions to achieve, for instance, alarm recovery, or to otherwise responding to one or more alarm events within the alarm event pattern, and/or (iv) notifying an operator of one or more future events or states within an industrial environment (for example, a fault state or fault event, a deviation state or a deviation event, an alarm state or alarm event etc.) that are predicted to occur or that are determined to have a probability of occurrence based on one or more alarm events within the detected alarm event pattern. The time of occurrence of the predicted alarm events are also presented. More details on alarm event pattern responses are provided subsequently.

Step 512A comprises generating a data record that includes data relating to the identified alarm event pattern and data relating to the alarm event pattern response that has been associated therewith. The data record may additionally store information linking or associating the identified alarm event pattern data and the corresponding alarm event pattern response data. The data record may be stored in a database—for example, database 108 within or communicably coupled with a process control system or an alarm system.

Figure 5B:
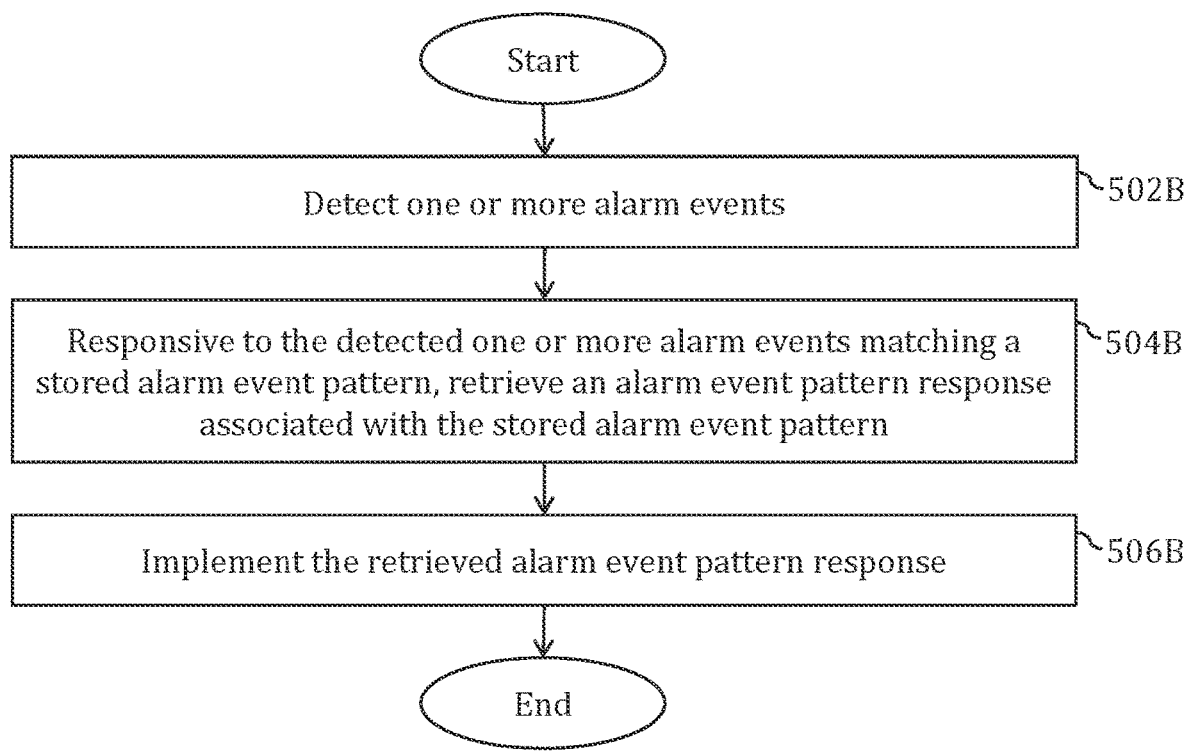
FIG. 5B is a flowchart illustrating a method of alarm handling based on the alarm rationalization from the method of FIG. 5A.

FIG. 5B is a flowchart illustrating a method of alarm handling based on the alarm rationalization processes that have been described in connection with the method of FIG. 5A. In an embodiment, the method of FIG. 5B may be implemented within an alarm system, or a process control system, or a server 106 within an alarm system or a process control system.

Step 502B comprises detecting one or more alarm events. The one or more alarm events may be detected by a server 106 communicably coupled with a process control system or an alarm system, and may be based on (i) state data received from one or more sensors or actuators or other devices within a process control system or an alarm system, (ii) one or more alarm event detection rules, alarm event detection criteria and/or alarm event detection models.

At step 504B, responsive to determining that the detected one or more alarm events matches a stored alarm event pattern, an alarm event pattern response is retrieved from a database configured to store alarm event pattern responses, or from a data record within such database. The retrieved alarm event pattern response is an alarm event pattern response that has been previously associated with the matched alarm event pattern in accordance with method step 510A and/or method step 512A of FIG. 5A.

As discussed above, in exemplary embodiments the retrieved alarm event pattern response may comprise initiating a control signal(s) for implementing one or more alarm response events—wherein an alarm response event may comprise one or more of (i) generating an alarm, an alert or a notification corresponding to each alarm event within the matched alarm event pattern, (ii) suppressing or removing one or more alarm events within the matched alarm event pattern, and generating an alarm, an alert or a notification corresponding to one or more other alarm events within the matched alarm event pattern, (iii) presenting an operator with a standardized operating procedure, a standardized guidance, or other instructions to achieve, for instance, alarm recovery, or otherwise responding to one or more alarm events within the matched alarm event pattern, (iv) transmitting and receiving data to and from one or more sensors or actuators or other devices within a process control system for rectifying a detected deviation from a normal process state, component state, device state or environment state and/or (v) notifying an operator of one or more future events or states within an industrial environment (for example, a fault state or fault event, a deviation state or a deviation event, an alarm state or alarm event etc.) that are predicted to occur or that are determined to have a probability of occurrence based on one or more alarm events within the matched alarm event pattern. The time of occurrence of the predicted alarm events are also presented.

Step 506B comprises implementing one or more (and preferably all) of the instructions, actions or steps that are defined within the retrieved alarm event pattern response.

Figure 6:
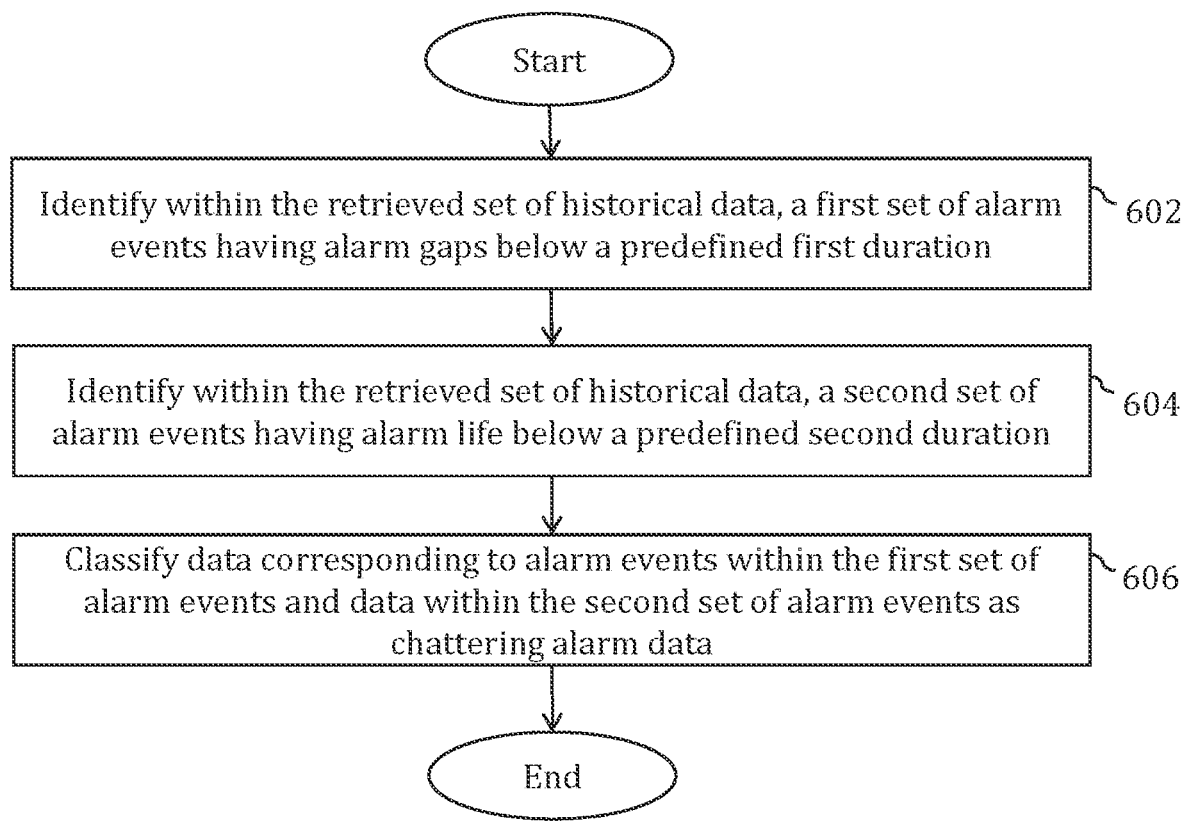
FIG. 6 is a flowchart illustrating a method of identification of chattering alarm data within a set of alarm and event data, in accordance with the teachings of at least one example embodiment.

FIG. 6 is a flowchart illustrating a method of identification of chattering alarm data within a set of alarm and event (A&E) data, in accordance with the teachings of at least one example embodiment. The method of FIG. 6 may be implemented for the purposes of step 504A and/or step 506A of FIG. 5A. In an embodiment, the method of FIG. 6 may be implemented within an alarm system, or a process control system, or a server 106 within an alarm system or a process control system.

Step 602 comprises identifying within a retrieved set of historical data comprising alarm and event log data (for example, the retrieved set of historical data from step 502A of FIG. 5A), a first set of alarm events, each alarm event within the first set of alarm events having an alarm gap less than or equal to a predefined first duration.

Figure 7A:
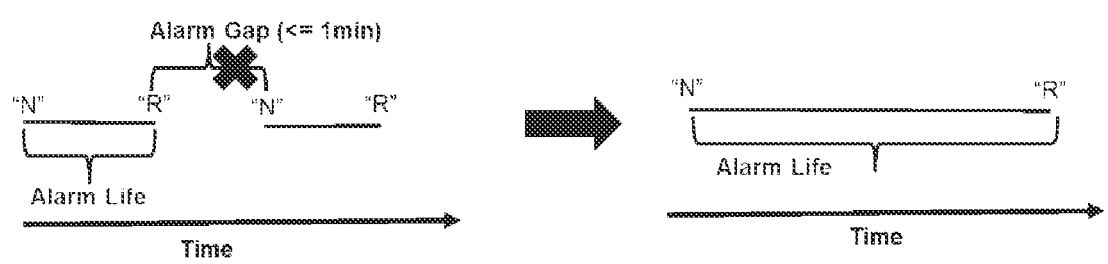
FIGS. 7A and 7B illustrate use of alarm gap and alarm life parameters to identify chattering alarms, in accordance with the teachings of at least one example embodiment.

For example, referring to the illustration of FIG. 7A, where the predefined first duration is 1 minute, step 602 would comprise identifying all alarm events having alarm gaps that are less than or equal to 1 minute. The predefined first duration may be selected to have a time value that represents a duration threshold within which all or a significant number of alarms tend to repeat. In other words, the predefined first duration may represent a time value that can be used to determine whether an alarm event that occurs consecutively qualifies as a "repeating alarm" of a type that may be considered a nuisance alarm. Therefore by identifying alarm events having alarm gaps below or equal to the predefined first duration, step 602 identifies a first set of repeating alarm events—that have a reasonable probability or a high probability of comprising nuisance alarm events, i.e. repeating alarms.

Step 604 comprises identifying within the retrieved set of historical data, a second set of alarm events, each alarm event within the second set of alarm events having an alarm life less than or equal to a predefined second duration.

Figure 7B:
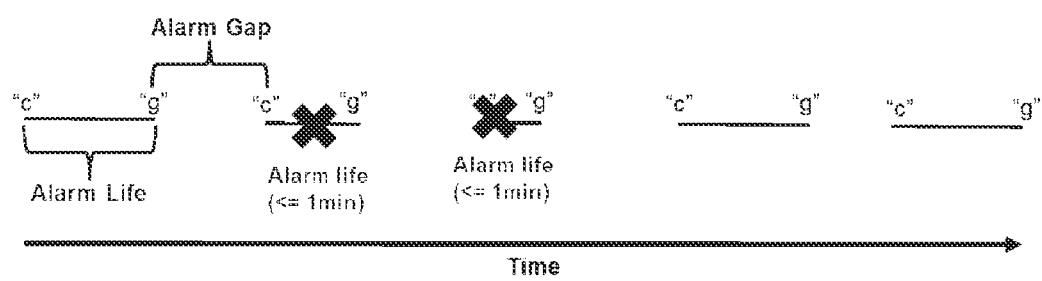

For example, referring to the illustration of FIG. 7B, where the predefined second duration is 1 minute, step 604 would comprise identifying all alarm events having an alarm life of less than or equal to 1 minute. The predefined second duration may be selected to have a time value that represents a duration threshold within which the alarm life of all or a significant number of fleeting alarms tends to repeat. In other words, the predefined second duration may represent a time value that can be used to determine whether an alarm event qualifies as a "fleeting alarm" of a type that may be considered a nuisance alarm. Therefore by identifying alarm events having an alarm life below the predefined second duration, step 604 identifies a second set of fleeting alarm events—that have a reasonable probability or a high probability of comprising nuisance alarm events, i.e. fleeting alarms.

It would be understood that the predefined first duration and the predefined second duration may have the same time value, or may have different time values.

Step 606 comprises classifying data corresponding to alarm events within the first set of alarm events (or the alarm events themselves) and data within the second set of alarm events (or the alarm events themselves) as chattering alarm data (or as chattering alarm events). In more specific embodiments, step 606 may comprise the step of classifying data corresponding to alarm events within the first set of alarm events (or the alarm events themselves) as repeating alarm data (or as repeating alarms), and/or classifying data corresponding to alarm events within the second set of alarm events (or the alarm events themselves) as fleeting alarm data (or as fleeting alarms). The classification information may be stored in a database that is communicably coupled with an alarm system, or a process control system, or a server within an alarm system or a process control system.

It would be understood that once chattering alarm data within a set of historical data (that comprises alarm and event log data) has been identified based on the method steps of FIG. 6, the chattering alarm data may be removed from the set of historical data, and the remaining data items within the set of historical data may be used to generate a reduced set of historical data (for example in accordance with step 506A of FIG. 5A). The reduced set of historical data may be analyzed for detecting alarm event patterns in accordance with the remaining method steps of FIG. 5A.

Figure 8:
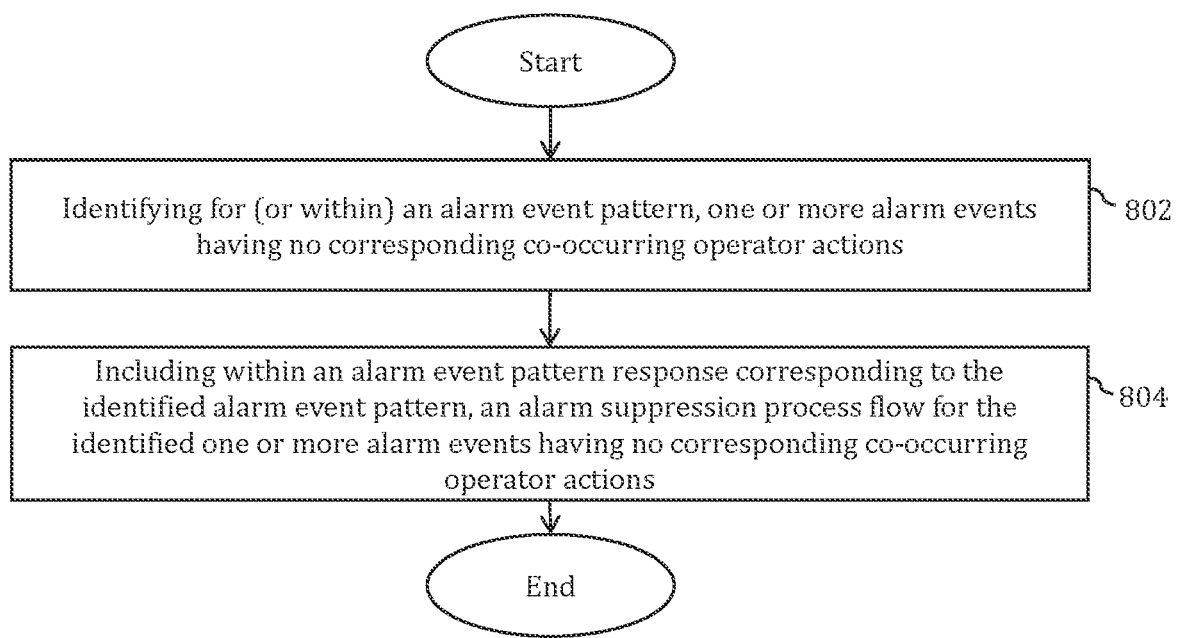
FIG. 8 is a flowchart illustrating a method of generating an alarm event pattern response for association with an alarm event pattern that includes one or more alarm events that do not require any relevant operator action to bring them back to a normal state.

FIG. 8 is a flowchart illustrating a method of generating an alarm event pattern response for association with an alarm event pattern that includes one or more alarm events that do not require any relevant operator action to bring them back to a normal state. The method of FIG. 8 may be implemented as part of step 506B of FIG. 5B, in cases where a retrieved alarm event pattern response includes the step of suppressing one or more detected alarms or alarm events. In an embodiment, the method of FIG. 8 may be implemented within an alarm system, or a process control system, or a server 106 within an alarm system or a process control system.

Step 802 comprises identifying for (or within) an alarm event pattern, one or more alarm events having no corresponding co-occurring operator actions. It should be understood that the term "co-occurring" does not only refer to a situation, wherein a corresponding operator action occurs simultaneously with its associated alarm event. The term also refers to a situation when a corresponding operator action is performed after its associated alarm event. The step of identifying one or more alarm events having no corresponding co-occurring operator actions may be implemented by parsing historical data comprising alarm and event logs to determine and identify alarm event(s) that consistently (i.e. at least two, and preferably more than two times) having no corresponding operator actions for alarm recovery or for restoring the concerned alarm to a normal state. In an embodiment, the step of identifying a candidate alarm event having no corresponding co-occurring operator actions may include:

determining one or more probabilities of co-occurrence of at least one detected operator action and the candidate alarm event; and
  responsive to the determined one or more probabilities of co-occurrence being less than a predefined value, identify the candidate alarm event as an alarm event having no corresponding co-occurring operator actions.

Step 804 comprises including within an alarm event pattern response that corresponds to the identified alarm event pattern, an alarm suppression process flow for addressing instances of the one or more alarm events that have been found to have no corresponding operator actions. In certain embodiments, the alarm suppression process flow may comprise instructions to prevent raising or presenting an alert, an alarm or a notification associated with one or more alarm events to an operator—and wherein said instructions may comprise, for instance, postponing the occurrence of one or more alarm events, or disregarding one or more alarm events.

By incorporating within an alarm event pattern response (corresponding to an alarm event pattern) an alarm suppression process flow associated with alarm events that are not associated with any relevant operator action, the method of FIG. 8 ensures that such alarm events are suppressed when they arise.

Figure 9:
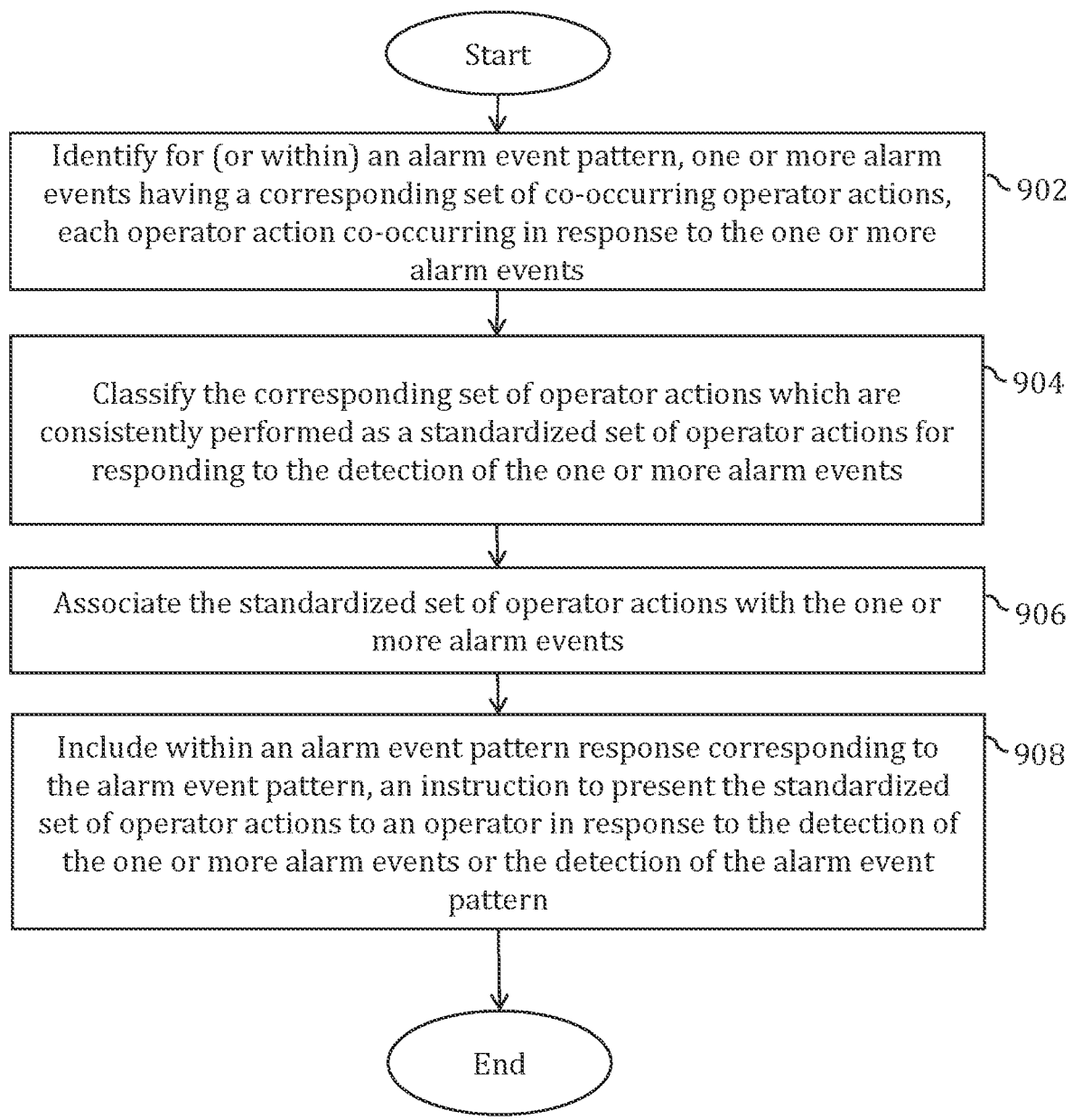
FIG. 9 is a flowchart illustrating a method for presenting an operator with a standardized set of operator actions for implementation in response to a detected alarm event, in accordance with the teachings of at least one example embodiment.

FIG. 9 is a flowchart illustrating a method for presenting an operator with a standardized set of operator actions for implementation in response to a detected alarm event, in accordance with the teachings of at least one example embodiment. The method of FIG. 9 may be implemented as part of step 506B of FIG. 5B, in cases where a retrieved alarm event pattern response includes the step of presenting an operator with a standardized set of operator actions for implementation. In an embodiment, the method of FIG. 9 may be implemented within an alarm system, or a process control system, or a server 106 within an alarm system or a process control system.

Step 902 comprises identifying for (or within) an alarm event pattern, one or more alarm events having a corresponding set of co-occurring operator actions, each operator action co-occurring in response to the one or more alarm events. The step 902 of identifying alarm events having a set of co-occurring operator actions, may be implemented by parsing historical data comprising alarm and event logs to determine and identify alarm event(s) that have corresponding co-occurring operator actions for alarm recovery or for restoring the concerned alarm to a normal state. In an embodiment, the step of identifying a candidate alarm event having a set of corresponding co-occurring operator actions may include:

determining one or more probabilities of co-occurrence of one or more operator actions with a reference alarm event;
  responsive to the determined one or more probabilities of co-occurrence of the one or more operator actions being greater than a predefined value, identifying the one or more operator actions as co-occurring operator actions that co-occur with the reference alarm event;

identifying timestamps associated with each of the one or more co-occurring operator actions; and ordering each of the plurality of co-occurring operator actions in a sequence, wherein the position of a co-occurring operator action that is sought to be ordered within the sequence is determined (i) based on a median time difference between a timestamp associated with the co-occurring operator action and a timestamp associated with a reference alarm event, and (ii) optionally based on a Median Absolute Deviation from the determined median time difference for the operator action.

Step 904 comprises classifying the corresponding set of operator actions which are consistently performed (i.e. at least two times, and preferably more than two times) as a standardized set of operator actions for responding to the detection of the one or more alarm events.

Step 906 comprises associating the standardized set of operator actions with the one or more alarm events within the alarm event pattern.

Step 908 comprises including within an alarm event pattern response corresponding to the alarm event pattern, initiating a control signal or an instruction to present the standardized set of operator actions to an operator in response to the detection of the one or more alarm events or in response to the detection of the alarm event pattern.

By incorporating within an alarm event pattern response (corresponding to an alarm event pattern) an instruction to present the standardized set of operator actions, the method of FIG. 9 ensures that operators can receive or be prompted with standardized guidance for responding to the detected one or more alarm events within an alarm event pattern when they arise.

Figure 10:
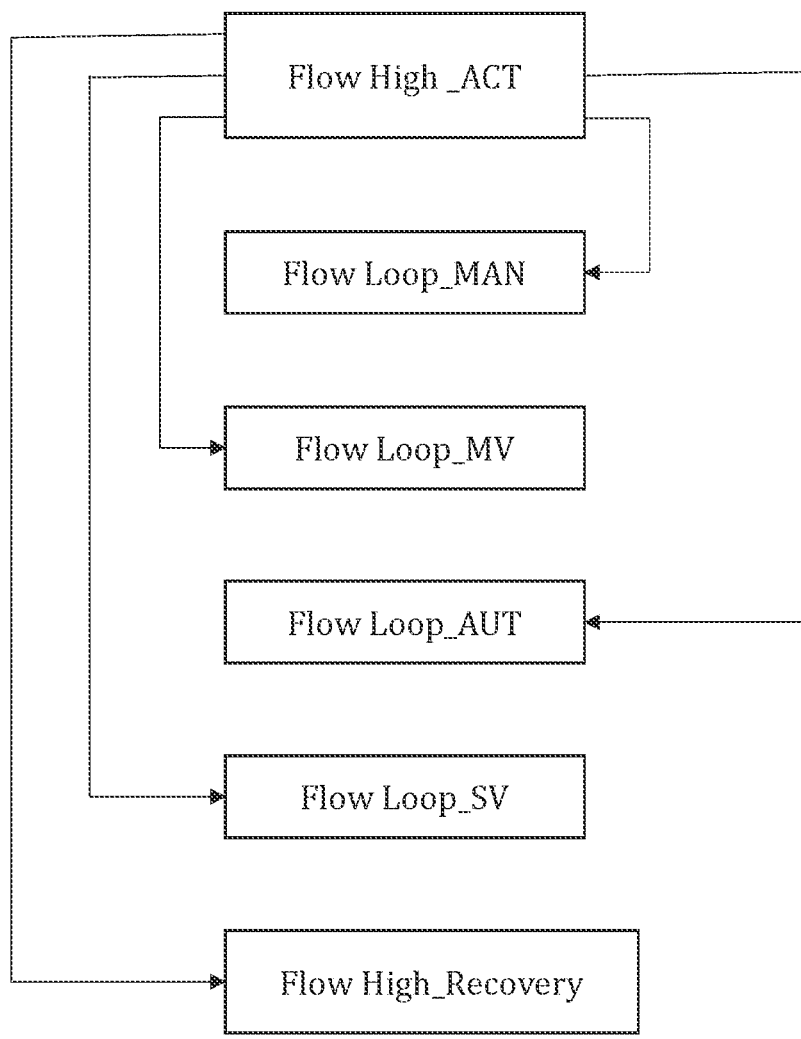
FIG. 10 is a sequence of operator actions seen in response to a Flow High alarm event—for illustrating an alarm event of a type that has historically triggered relevant operator action.

FIG. 10 is an exemplary sequence of operator actions observed in response to a Flow High alarm event—for illustrating an alarm event of a type that has historically triggered corresponding co-occurring operator actions, as discussed in connection with FIG. 9. The illustrative sequence is based on an exemplary analysis of data from a petrochemical plant.

In particular, a sequence of operator actions that were consistently observed/recorded between a "Flow High" alarm activation and recovery was detected. As illustrated in FIG. 10, the consistent handling steps for responding to detection of a "High" alarm in a flow variable include (i) first manipulating/adjusting/fine tuning the manipulated variable (MV) of the flow loop in manual (MAN) mode, (ii) followed by taking the flow loop in auto (AUT) mode, and (iii) further adjusting the set point (SV) of the flow variable. These consistently observed operator actions may be used to generate a standardized set of operator actions that can be presented to an operator as standardized guidance for responding to a "Flow High" alarm event within a detected alarm event pattern.

Figure 11:
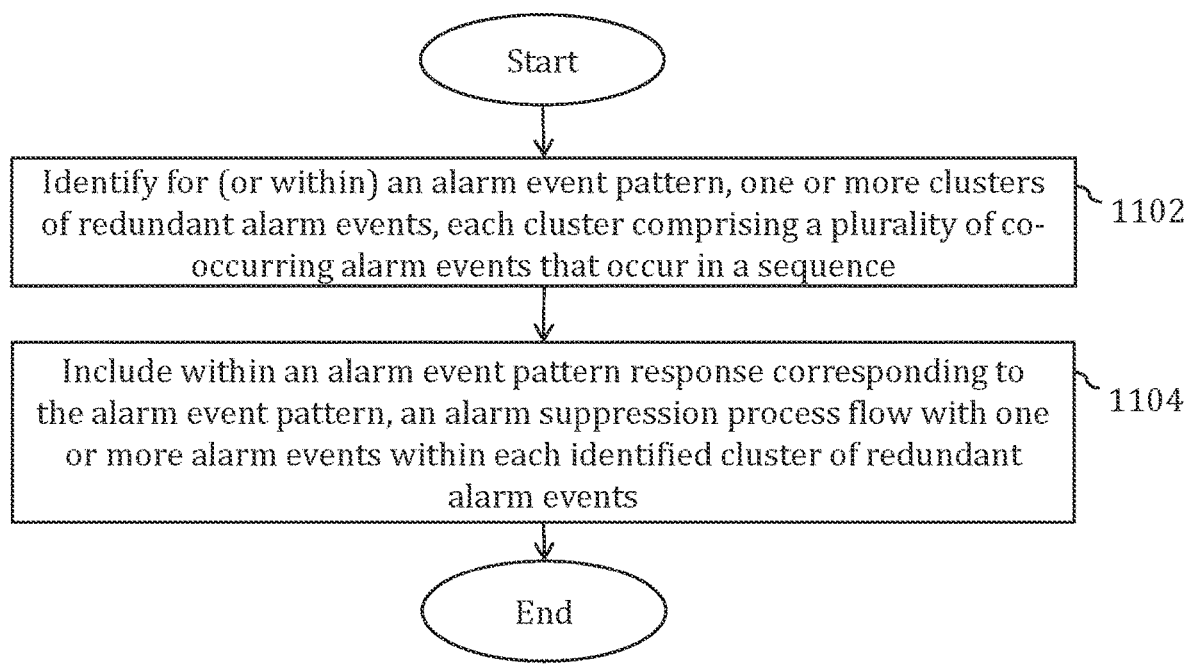
FIG. 11 is a flowchart illustrating a method of generating an alarm event pattern response for association with an alarm event pattern that includes one or more clusters of redundant alarm events, in accordance with the teachings of at least one example embodiment.

FIG. 11 is a flowchart illustrating a method of generating an alarm event pattern response for association with an alarm event pattern that includes one or more clusters of redundant alarm events, in accordance with the teachings of at least one example embodiment.

The method of FIG. 11 may be implemented as part of step 506B of FIG. 5B, in cases where a retrieved alarm event pattern response includes the step of suppressing one or more detected alarms or alarm events. In an embodiment, the method of FIG. 11 may be implemented within an alarm system, or a process control system, or a server 106 within an alarm system or a process control system.

Step 1102 comprises identifying for (or within) an alarm event pattern, one or more clusters of redundant alarm events, each cluster comprising a plurality of co-occurring alarm events occurring in a sequence within a very short period of time. It should be understood that the term "co-occurring" does not necessarily refer only to a situation, wherein a plurality of alarm events occur simultaneously. It can also refer to a situation when a plurality of alarm events occur in different timing but all within a short period of time. The step of identifying clusters of redundant alarm events may be implemented by parsing historical data comprising alarm and event logs to determine and identify one or more clusters of redundant alarm events. In an embodiment, the step of identifying a cluster of co-occurring alarm events occurring in a sequence within a very short period of time may include clustering and sequencing a plurality of alarm events based on:

determining one or more probabilities of co-occurrence of at least one candidate alarm event with a reference alarm event;

responsive to the determined one or more probabilities of co-occurrence being greater than a predefined value, identifying the candidate alarm event as a co-occurring alarm event that co-occurs with the reference alarm event;

generating a cluster of alarm events comprising the reference alarm event and the identified one or more co-occurring alarm events, i.e. the identified one or more candidate alarm events;

identifying timestamps associated with each of the plurality of alarm events within the generated cluster of alarm events; and ordering each of the plurality of alarm events within the generated cluster of alarm events in a sequence, wherein the position of an alarm event that is sought to be ordered within the sequence is determined (i) based on a median time difference between a timestamp associated with the reference alarm event within the cluster of alarm events and a timestamp associated with a candidate alarm event, and (ii) optionally based on a Median Absolute Deviation from the determined median time difference for the candidate alarm event.

Step 1104 comprises incorporating or including within an alarm event pattern response corresponding to the alarm event pattern, an alarm suppression process flow with one or more alarm events within each identified cluster of redundant alarm events. The alarm suppression process flow is intended for addressing instances of one or more alarm events within each of the identified clusters of redundant alarm events. In certain embodiments, the alarm suppression process flow may comprise instructions to prevent raising or presenting of an alert, an alarm or a notification associated with one or more alarm events within each of the identified clusters of redundant alarm events to an operator, said instructions may comprise, for instance, postponing the occurrence of one or more alarm events, or disregarding one or more alarm events. In a specific embodiment, the alarm suppression process flow may comprise (i) rejecting, disregarding, postponing, ignoring or refusing instructions to raise an alert, an alarm or a notification associated with one or more alarm events within each of the identified clusters of redundant alarm events, and (ii) raising an alert, an alarm or a notification associated with at least one or more other alarm event within each of the identified clusters of redundant alarm events.

By identifying clusters of redundant alarm events, and generating alarm suppression workflows for suppressing one or more alarm events within each identified clusters of redundant alarm events, the method of FIG. 11 eliminates one or more redundant alarms or alarm events when they arise.

Figure 12:
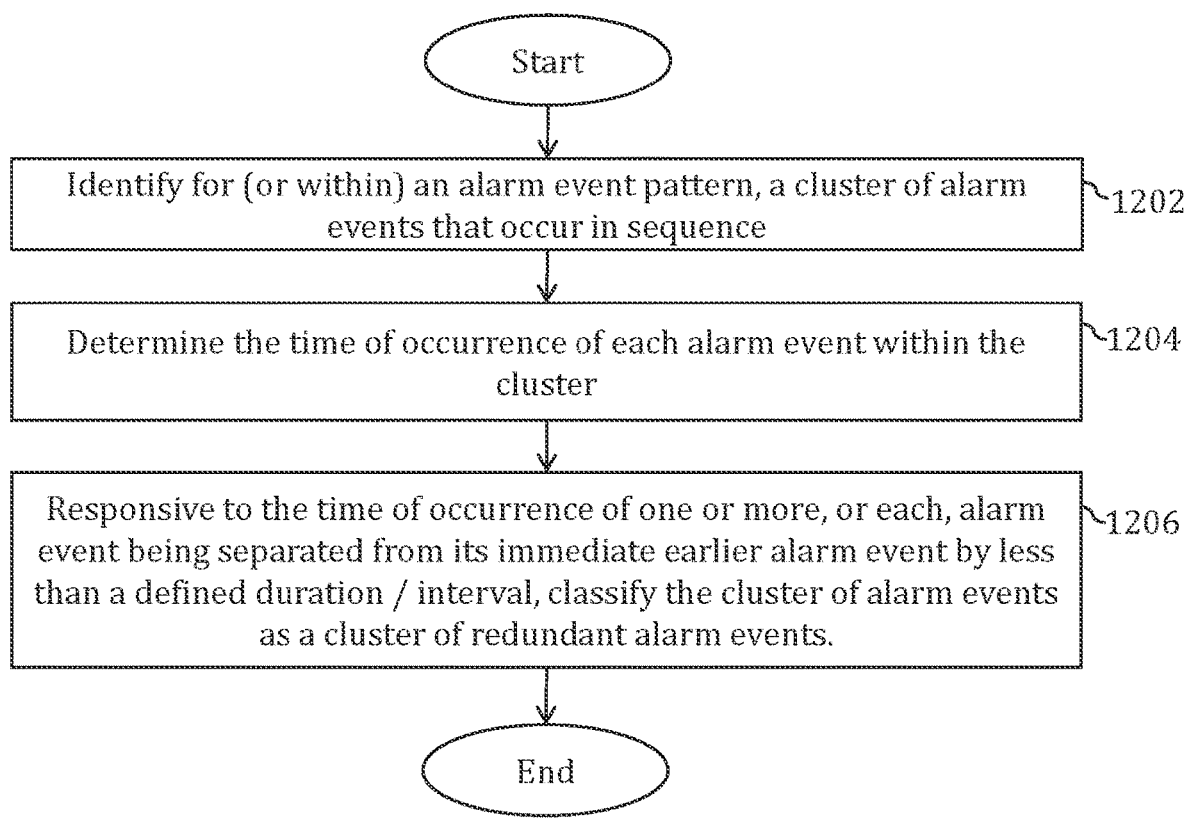
FIG. 12 is a flowchart illustrating a method for identification of redundant alarms events for clustering redundant alarm events, in accordance with the teachings of the method of FIG. 11.

FIG. 12 is a flowchart illustrating a method for identification of redundant alarms events for clustering redundant alarm events, in accordance with the teachings of the method of FIG. 11.

The method of FIG. 12 may be implemented as part of step 1102 of FIG. 11. In an embodiment, the method of FIG. 12 may be implemented within an alarm system, or a process control system, or a server 106 within an alarm system or a process control system.

Step 1202 comprises identifying for (or within) an alarm event pattern, a cluster of alarm events that occur in sequence.

Step 1204 comprises determining a time of occurrence of each alarm event within the cluster. The time of occurrence associated with an alarm event may be determined based on a recorded timestamp associated with the alarm event.

Step 1206 comprises responding to a determination that a time of occurrence of one or more (and preferably each) alarm events within the cluster, is separated from its immediate earlier alarm event within the cluster by less than a defined duration/interval/time value, by classifying the cluster of alarm events as a cluster of redundant alarm events.

By enabling identification of redundant alarm event clusters, the method of FIG. 12 prepares for subsequent generation of alarm suppression workflows for suppressing one or more alarm events within each identified cluster of redundant alarm events (for example, in accordance with the method of FIG. 11).

Figure 13:
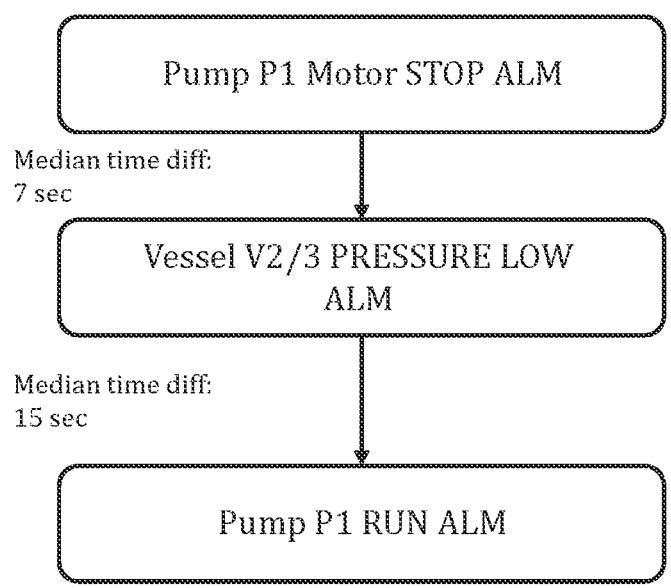
FIG. 13 is an exemplary illustration of a group of alarms comprising one or more redundant alarms events—of a type that may be subjected to alarm suppression in accordance with teachings of at least one example embodiment.

FIG. 13 is an exemplary illustration of a group of alarms comprising one or more redundant alarms events—of a type that may be subjected to alarm suppression in accordance with teachings of at least one example embodiment.

The illustration is based on an exemplary analysis of data from a petrochemical plant—and shows an example of a redundant alarm group which is identified after analyzing the alarm and event log from the petrochemical plant. As shown in the illustration, three discrete alarms—i.e. a "pump P1 motor stop" alarm, a "vessel V2/3 pressure low" alarm and a "pump P1 run" alarm were consistently observed to occur together within a very short period of time (approximately 22 sec). According to the analysis, all three alarms were found to be triggered by the same root cause—and would therefore be classified as a cluster of redundant alarm events in accordance with the method of FIG. 12.

Figure 14:
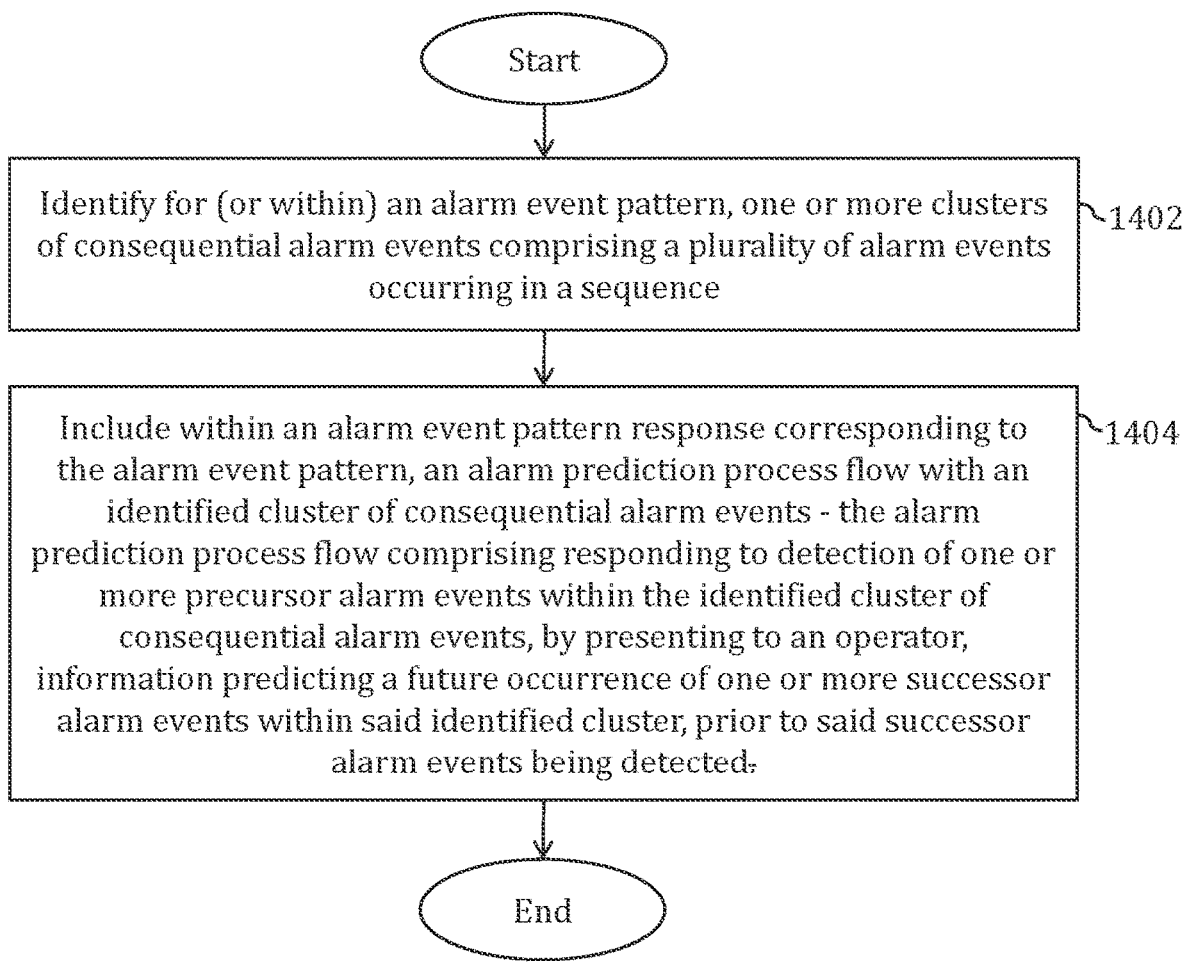
FIG. 14 is a flowchart illustrating a method of predictive alarm event detection, in accordance with the teachings of at least one example embodiment.

FIG. 14 is a flowchart illustrating a method of predictive alarm event detection, in accordance with the teachings of at least one example embodiment. The method of FIG. 14 may be implemented as part of step 506B of FIG. 5B, in cases where a retrieved alarm event pattern response includes the step of predictive alarm event detection based on one or more detected alarms or alarm events. In an embodiment, the method of FIG. 14 may be implemented within an alarm system, or a process control system, or a server 106 within an alarm system or a process control system.

Step 1402 comprises identifying for (or within) an alarm event pattern, one or more clusters of consequential alarm events comprising a plurality of alarm events occurring in a sequence. The step of identifying alarm events occurring in a sequence, may be implemented by parsing historical data comprising alarm and event logs to determine and identify alarm event(s) that consistently (i.e. at least two, and preferably more than two times) occur in an identical sequence. In an embodiment, the step of identifying a cluster of alarm events occurring in a sequence may include clustering and sequencing a plurality of alarm events based on:

determining one or more probabilities of co-occurrence of at least one candidate alarm event with a reference alarm event;

responsive to the determined one or more probabilities of co-occurrence being greater than a predefined value, identifying the candidate alarm event as a co-occurring alarm event that co-occurs with the reference alarm event;

generating a cluster of alarm events comprising the reference alarm event and the identified one or more co-occurring alarm events, i.e. the one or more candidate alarm events;

Identifying timestamps associated with each of the plurality of alarm events; and Ordering each of the plurality of alarm events within a sequence, wherein the position of a candidate alarm event that is sought to be ordered within the sequence is determined (i) based on a median time difference between a timestamp associated with a reference alarm event within the cluster of alarm events and a timestamp associated with the candidate alarm event, and (ii) optionally based on a Median Absolute Deviation from the determined mediate time difference for the candidate alarm event.

Step 1404 comprises including within an alarm event pattern response corresponding to the identified alarm event pattern, an alarm prediction process flow with an identified cluster of consequential alarms. The alarm prediction process flow may include the step of responding (or initiating a response) to detection of an occurring instance of one or more precursor alarm events within the identified cluster of consequential alarm events, by presenting to an operator, information predicting a future occurrence of one or more instances of successor alarm events within said identified cluster of consequential alarm events, prior to said instances of the successor alarm events being detected.

In a particular embodiment, the information predicting the future occurrence of one or more instances of successor alarm events within the identified cluster of consequential alarm events, includes information identifying one or more predicted time values representing an estimated time value or a time window within which the future occurrence of the one or more instances of successor alarm events is predicted to occur.

The identified cluster of consequential alarm events comprises one or more precursor alarm events and one or more successor alarm events. Additionally, each of the one or more successor alarm events comprise alarm events that occur subsequently to the corresponding one or more precursor alarm events, within the identified cluster of consequential alarm events.

By incorporating within an alarm event pattern response (corresponding to an alarm event pattern), an instruction to predict the occurrence of one or more instances of successor alarm events based on detection of one or more instances of precursor alarm events, the method of FIG. 14 enables an operator to receive advance intimation of likely alarm events, so that an operator can take appropriate action to remedy or eliminate the abnormal or deviant process state, component state, device state or environment state that is likely to cause the successor alarm event(s), even before the successor alarm event occurs. The probability and time of occurrence of the predicted successor alarms are also notified to the operators.

Figure 15:
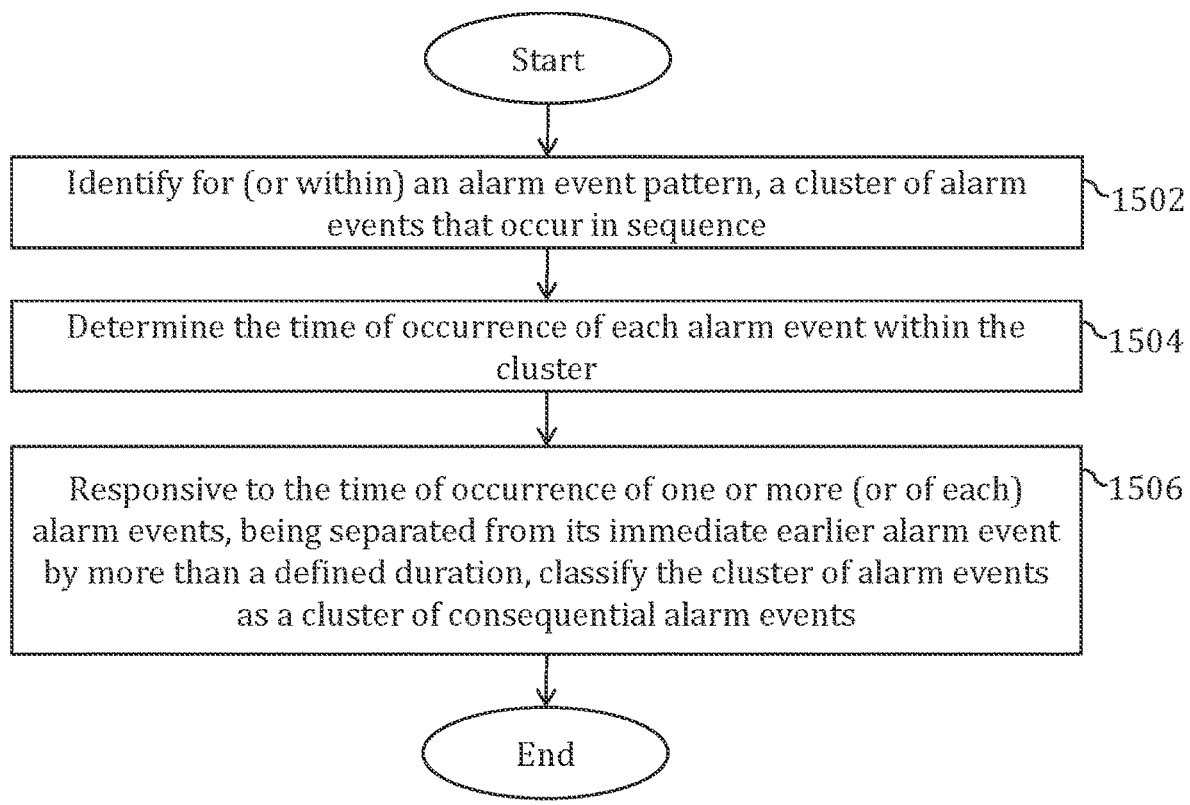
FIG. 15 is a flowchart illustrating a method of clustering related or consequential alarm events in accordance with the teachings of at least one example embodiment.

FIG. 15 is a flowchart illustrating a method of clustering related consequential alarm events, in accordance with the teachings of the method of FIG. 14. The method of FIG. 15 may be implemented as part of step 1402 of FIG. 14. In an embodiment, the method of FIG. 15 may be implemented within an alarm system, or a process control system, or a server 106 within an alarm system or a process control system.

Step 1502 comprises identifying for (or within) an alarm event pattern, a cluster of alarm events that occur in sequence. The step of identifying alarm events that occur in sequence may be implemented by parsing historical data comprising alarm and event logs to determine and identify sequences of alarm event(s) that consistently occur (i.e. that occur at least two, and preferably more than two times).

Step 1504 comprises determining a time of occurrence of each alarm event within the identified cluster of sequentially occurring alarm events. The time of occurrence associated with an alarm event may be determined based on a recorded time stamp associated with the alarm event.

Step 1506 comprises responding to a determination that the time of occurrence associated with one or more (or preferably each) alarm events within the cluster, is separated from its immediate earlier alarm event within the cluster by more than a defined duration, for instance, 5 mins or more than 5 mins, by classifying the cluster of alarm events as a cluster of consequential alarm events.

By enabling identification of consequential alarm event clusters, the method of FIG. 15 enables subsequent generation and implementation of alarm prediction process flows for predicting future occurrences of one or more alarm events within a consequential alarm event cluster in response to detecting an occurrence of one or more earlier occurring alarm events within the same consequential alarm event cluster (for example, in accordance with the method of FIG. 14).

Figure 16:
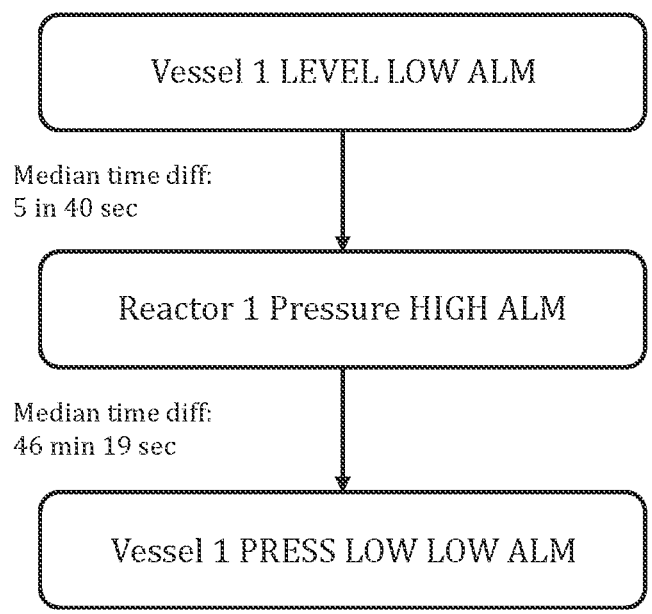
FIG. 16 is an exemplary illustration of a group of alarm events comprising one or related alarm events—of a type that may be used for predictive alarm event detection in accordance with teachings of at least one example embodiment.

FIG. 16 is an exemplary illustration of a group of alarm events comprising one or more related alarm events—of a type that may be used for predictive alarm event detection in accordance with the teachings of at least one example embodiment.

The illustration is based on an exemplary analysis of data from a petrochemical plant—and shows an example of an identified consequential alarm event cluster obtained after analyzing the historical alarm and event log data from the petrochemical plant. As shown in FIG. 16, the alarm "Vessel 1 Pressure Low" alarm can be predicted approximately 52 mins in advance of actual occurrence based on the occurrence of its precursor "Vessel 1 level Low" alarm.

The subsequent paragraphs discuss exemplary implementations of the methods of at least one example embodiment.
Exemplary Method for Identifying Redundant and/or Consequential Alarms Preliminary Elimination of Nuisance Alarms: As discussed above, identification of alarm event patterns may optionally be preceded by identification and elimination of nuisance alarm events from the analysis. For example, low-priority alarms, and chattering alarms such as fleeting alarms and repeating alarms can be identified from a retrieved alarm and event log, and the dataset of the alarm and event log can be reduced for further analysis by first removing these unwanted alarm events.

Generation of A List of Unique Alarms: Subsequently the method may involve the step of creation of a list of unique alarm events, and determining a total number of occurrences of each unique alarm event within the list. The unique alarm events within alarm and event log are first identified. In an embodiment, a combination of two fields in an alarm and event log is used to define an identified unique alarm event. For example, the unique combination of a Tag Name (e.g., 29-FIC-1111.PV) field and a Condition field (e.g., High) can be used for identifying the unique alarm event as "29-FIC-1111.PV_High". Once all unique alarm events in the alarm and event log are identified, the total number of occurrences of each unique alarm event within the entire alarm and event log is determined, and a list may be generated, which contains all the unique alarm events and the corresponding number of occurrences found in the entire alarm and event log.

Figure 17:
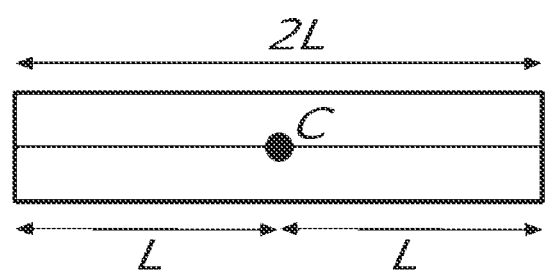
FIG. 17 illustrates creation of an exemplary time window for implementing steps of the method of FIG. 15.

Generation of Time Windows: Thereafter, time windows corresponding to each unique alarm event may be generated. For example, we may assume that for each unique alarm event, we consider a time window of total 2 L hour duration, which starts at L hours prior to the occurrence of the unique alarm and terminates at L hours after the occurrence of the unique alarm. Therefore, considering the parameter L=2 h, if the time of occurrence of an unique alarm event C is at 8:00:00 AM on Dec. 12, 2019, then a time widow of total 4 hour duration will be considered from 6:00:00 AM to 10:00:00 AM on Dec. 12, 2019. Since a unique alarm event can occur multiple times in the alarm and event log, a time window as discussed above is considered for each occurrence of each unique alarm event. For instance, if a unique alarm event C has a total 5 occurrences, then 5 such time windows will be created. An exemplary time window of the kind discussed in this paragraph is illustrated in FIG. 17.

Figure 18:
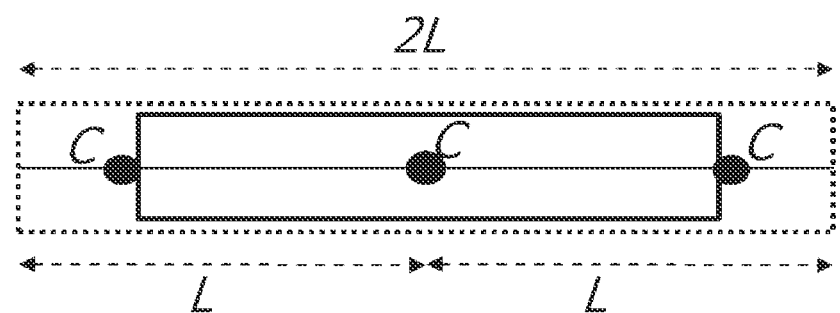
FIG. 18 illustrates an exemplary truncation of a time window of a kind that may be used for implementing steps of the method of FIG. 15.

Continuing with the above example, if there are multiple occurrences of the same unique alarm event C within a time window of alarm C, then the time window, of which the total duration is 2 L hour, will be truncated just after or before the other occurrences of alarm event C, so that no other occurrences of the same alarm event C is included within the time window of an instance of the alarm C. The exemplary time window discussed in this paragraph is illustrated in FIG. 18.

Creation of Actual Matrix: After time windows are created for each unique alarm event, the other alarm events that occur in each time window are identified and their number of occurrences in each time window are calculated. This information may be stored in the form of a $N_C \times N_{unique}$ matrix, which may be referred to as an Actual Matrix.

Figure 19:
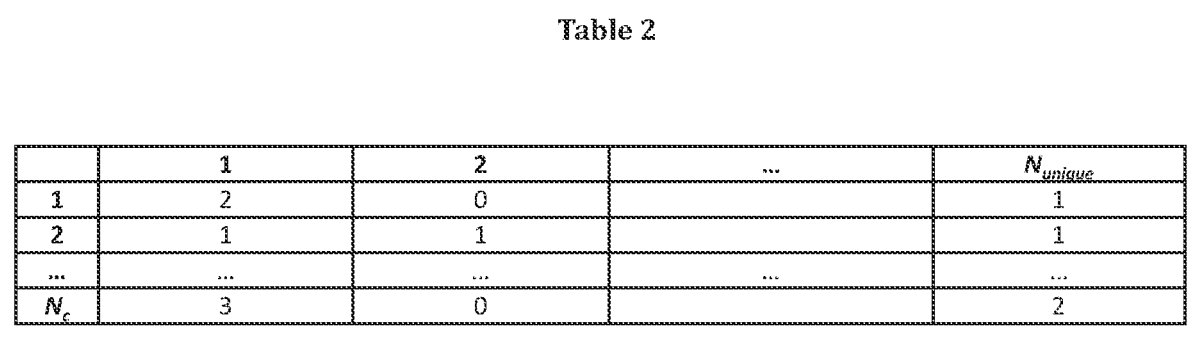

A total number of rows in the Actual Matrix ($N_C$)=total number of Time Windows of C=total number of occurrences of alarm event C in the log. A total number of columns in the Actual Matrix ($N_{unique}$)=number of unique alarm events in the log. An element $N_{ij}$ in the Actual Matrix represents the total number of occurrences of $j^{th}$ unique alarm event in the $i^{th}$ time window. An illustrative example of an Actual Matrix is provided in Table 2, shown in FIG. 19—which may be used for storing data corresponding to occurrences of alarm events within a specific time window.

Generation of Time Difference Matrix: A Time Difference Matrix is again a ($N_C \times N_{unique}$) matrix which stores the time difference between the other alarm events and the unique alarm event C in each time window for the alarm event C. An element $N_{ij}$ in the Time Difference Matrix represents the time difference between the $j^{th}$ unique alarm event and the unique alarm event C in the $i^{th}$ time window of alarm event C.

Figure 20:
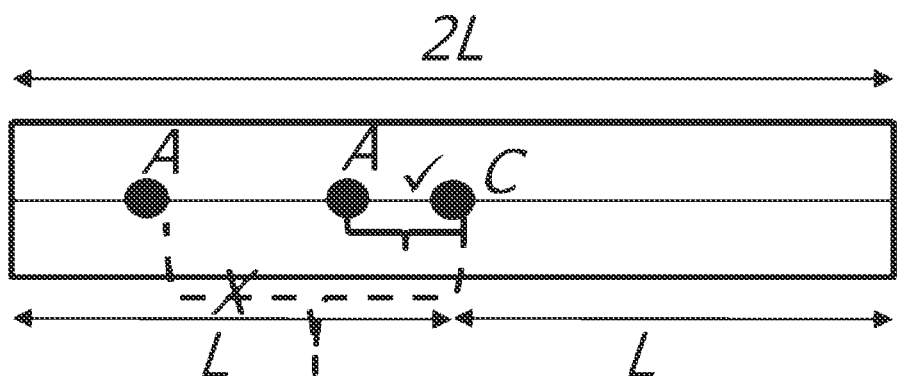
FIG. 20 illustrates the principles of a time difference determination when there are multiple occurrences of a second alarm event within a time window associated with a first alarm event.

If there are multiple occurrences of a second alarm event A in a same time window, then for calculating the time difference between the first alarm event C and the second alarm event A, the occurrence of alarm event A which is closest to the occurrence of alarm event C in that time window is considered—as shown in FIG. 20, which illustrates the principles of a time difference determination when there are multiple occurrences of a second alarm event within a time window associated with a first alarm event. Table 3 in FIG. 21 illustrates a Time Difference Matrix used for storing time difference data, when there are multiple occurrences of a second alarm event within a time window associated with a first alarm event.

Generation of a Timestamp Matrix: Thereafter a Timestamp Matrix may be generated—comprising a ($N_C \times N_{unique}$) matrix. The Timestamp Matrix stores the timestamp of other unique alarms which are closest to the alarm C in a time window of alarm C. Table 4 in FIG. 22 illustrates a Timestamp Matrix used for storing timestamp data in accordance with the teachings of at least one example embodiment.

The next step for implementing at least one example embodiment comprises, for two consecutive time windows, checking if the timestamp value for a given associated alarm is exactly the same. If the timestamp value for the given associated alarm in the two time windows is exactly the same, in that case both the Actual Matrix and Time Difference Matrix may be updated as follows:

- In the Time Difference Matrix for the associated alarm event, the entry for the time window with the least absolute time difference is retained, while the other time window entry is set to a null value.
- In the Actual Matrix for the associated alarm event, the entry for the time window with the least absolute time difference is retained, while the other time window entry set is set to zero.

The update procedure of both the Actual Matrix in Table 2 and the Time Difference Matrix in Table 3 based on the Timestamp Matrix in Table 4 is described with reference to the Figures in more details below:

- It will be observed that the Timestamp Matrix in Table 4 has exactly the same timestamp in two consecutive windows (Rows #1 and #2—i.e. the highlighted cells in Table 4).
- In the Time Difference Matrix in Table 3, the entry for the time window (Row #2) with the least absolute time difference (1050 sec) is retained. The entry of the other time window (Row #1) is set as null.
- Similarly, the Actual Matrix in Table 2 was also updated. Here, the entry for the time window (Row #2) with the least absolute time difference (1050) is retained. The other time window entry (Row #1) is set as zero. The updated Actual Matrix and updated Time Difference Matrix are shown as Table 5 (see FIG. 23) and Table 6 (see FIG. 24) respectively. The updated cells in each table are highlighted.

Generation of a Binary Matrix: The next step for implementation comprises generating a Binary Matrix from the Actual Matrix. For generating the Binary Matrix, all positive value entries in the Actual Matrix are set as 1. An exemplary Binary Matrix derived from the updated Actual Matrix in Table 5 (see FIG. 23) is shown as Table 7 in FIG. 25.

Generation of Forward Probabilities: The forward probability of an alarm event A with respect to an alarm event C indicates the probability of co-occurrence of alarm event A with alarm event C given the occurrence of alarm event C. A forward probability of an alarm event A with respect to an alarm event C can be calculated from the binary matrix of alarm event C as follows:

Forward Probability=(number of time windows of alarm event C in which the alarm event A is present)/(Total number of time windows of alarm event C)  (Equation 1)

The numerator in the above forward probability equation is simply the column sum of the Binary Matrix described above, and the denominator is the total number of occurrences of alarm event C in the entire alarm and event log.

Generation of Backward Probabilities: A backward probability of an alarm event A with respect to an alarm event C indicates the probability of co-occurrence of alarm event A with alarm event C given the occurrence of alarm event A. A backward probability of an alarm event A with respect to an alarm event C can be calculated as:

Backward Probability=(Total number of instances of alarm event A in all the time windows of alarm event C)/(Total number of instances of alarm event A in the entire log)  (Equation 2)

The numerator in the above backward probability equation can be obtained from the column sum of the updated Actual Matrix.

If both forward and backward probability values of an alarm event A with respect to an alarm event C exceed a predefined threshold (for example, 80%) set by the operator or user, then the alarm event A is considered to be strongly associated with alarm event C and vice versa, for instance, alarm event A and alarm event C belong to a cluster of redundant alarm events.

Calculation of Median Time Difference and Median Absolute Deviation (MAD) from Median Time Difference: For all the associated alarms of an alarm event C that satisfy the predefined criteria of forward and backward probabilities, both of a Median Time Difference and a Median Absolute Deviation (MAD) from Median Time Difference are calculated based on the Time difference Matrix.

After identifying all the associated alarm events for an alarm event C, the identified associated alarm events are sorted in ascending order based on their Median Time difference value from alarm event C. This provides a sequence of alarm events in an alarm event cluster/alarm event group with the Median Time difference value between them.

Exemplary Methods for Identifying No Action Alarms and Alarm Response Procedure for True Alarms Preliminary Elimination of Nuisance Alarms: Identification of alarm event patterns may optionally be preceded by identification and elimination of nuisance alarm events from the analysis. For example, low-priority alarm events, and chattering alarm events such as fleeting alarm events and repeating alarm events, can be identified from a retrieved alarm and event log, and the dataset within the alarm and event log can be reduced for analysis by first removing these unwanted alarms.

Generation of List of Unique Alarms: Subsequently the method involves the step of creation of a list of unique alarm events, and determining a total number of occurrences of each unique alarm event within the list. The unique alarm events within the alarm and event log are first identified. In an embodiment, a combination of two fields in an alarm and event log is used to define an identified unique alarm event. For example, the unique combination of a Tag Name (e.g., 29-FIC-1111.PV) field and a Condition field (e.g., High), i.e. "29-FIC-1111.PV_High" can be used for identifying the unique alarm "29-FIC-1111.PV_High". Once all the unique alarm events in the alarm and event log are identified, the total number of occurrences of each unique alarm event within the entire alarm and event log is determined, and a list may be generated, which contains all the unique alarm events and the corresponding number of occurrences found in the entire alarm and event log.

Generation of a unique operator action list and total number of occurrences of each unique operator action: the unique operator actions in the entire alarm and event log are first identified. The combination of two fields in the alarm and event log may define a unique operator action. For example, the unique combination of Tag Name (e.g., 29-FIC-1111) field and the parameter field (e.g., AUT) which is 29-FIC-1111_AUT, in this example defines a unique operator action. Once, all the unique operator actions in the log are identified, the total number of occurrences of each of the unique operator actions in the entire log is computed and a list is created which contains all the unique operator actions and their corresponding number of occurrences in the entire log.

Identification of all the Alarm Notification and Recovery timestamp pairs for each unique alarm event: for each unique alarm event C, all Alarm Notification timestamps and their corresponding Alarm Recovery timestamps are identified and stored. Then all alarm recovery time of each unique alarm event C are calculated from the time difference between the Alarm Notification timestamps and their corresponding Alarm Recovery timestamps. Finally, the median time to recovery and the MAD from median time to recovery for each unique alarm event are determined.

Figure 26:
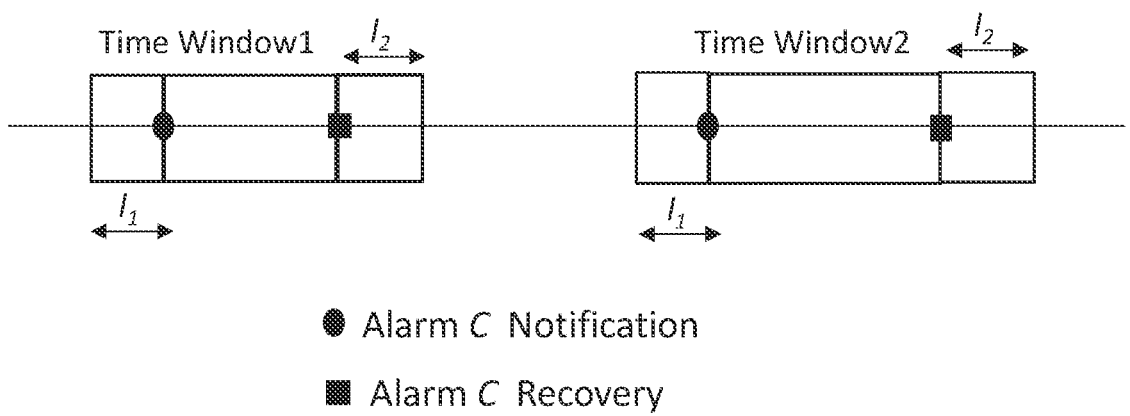
FIG. 26 illustrates time window formation for a unique alarm event, in accordance with the teachings of at least one example embodiment.

Creation of Time Windows for each unique Alarm: For each unique alarm event C, a time window spanning from its Alarm Notification time to the Alarm Recovery time is determined or generated, and the time window is then elongated on both sides by adding and subtracting the time duration (e.g., $l_1$ minutes) to consider after alarm recovery and the time duration (e.g., $l_2$ minutes) to consider before alarm notification respectively. The parameters $l_1$ and $l_1$ should be configurable by a user or operator. A time window generated in this manner is illustrated in FIG. 26 below.

If this elongated time window starts before the previous Alarm Recovery event, then the time window elongation may be truncated up to the previous Alarm Recovery event. On the other hand, if this elongated time window ends after the next Alarm Notification event, then the time window elongation may be truncated up to the next Alarm Notification event.

Creation of Actual Matrix: After all time windows are created for each unique alarm event, the operator actions that occur in each time window are identified and their number of occurrences in each time window are calculated. This information is systematically stored in the form of $N_C \times N_{uniqueOP}$ matrix, called the Actual matrix.

A total number of rows in the Actual Matrix ($N_C$)=total number of Time Windows of C=total number of occurrences of alarm event C in the log. A total number of columns in the Actual Matrix ($N_{uniqueOP}$)=number of unique operator actions in the log. An element $N_{ij}$ in the actual matrix represents the total number of occurrences of $j^{th}$ unique operator action in the $i^{th}$ time window.

Generation of Time Difference Matrix: The time difference matrix is again a same dimensional ($N_C \times N_{uniqueOP}$) matrix which stores the time difference between the operator actions and the unique alarm event C in each time window of alarm event C. An element $D_{ij}$ in the time difference matrix represents the time difference between the $j^{th}$ unique operator action and the unique alarm event C in the $i^{th}$ time window of alarm event C.

Figure 27:
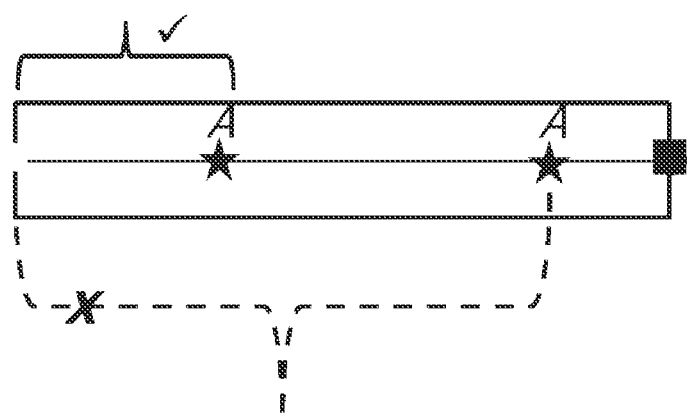
FIG. 27 illustrates time difference calculation between an associated action and a corresponding focused alarm event, when there is more than one occurrence of the action in the same time window, in accordance with the teachings of at least one example embodiment.

If there are multiple occurrences of an associated operator action A within a same time window of alarm event C, then for calculating the time difference between the associated operator action A and the alarm event C, the occurrence of operator action A which is closest from the notification of the alarm event C (i.e., the one with minimum absolute time difference) in that time window is considered. FIG. 27 illustrates time difference calculation between an associated operator action and a corresponding alarm event, when there is more than one occurrence of the operator action in the same time window, in accordance with the teachings of at least one example embodiment.

Generation of a Time Stamp Matrix: The Timestamp Matrix is again a ($N_C \times N_{unique}$) matrix. It stores the timestamp of the unique operator actions which are closest to the alarm event C in a time window of alarm event C.

In an embodiment, for two consecutive time windows, a check may be carried out to determine whether the timestamp value for a given operator action in the two time windows is exactly the same. If the timestamp value for the given operator action in the two time windows is exactly the same, in that case both the Actual Matrix and Time Difference Matrix may be updated, and the updates will be as follows:

In the Time Difference Matrix, for that given operator action, the entry for the time window with the least absolute time difference is retained. The other time window entry is set as null.

In the Actual Matrix, for that given operator action, the time window with the least absolute time difference is retained. The other time window entry is set as zero.

Generation of a Binary Matrix: The next step for implementation comprises generating a Binary Matrix from the Actual Matrix. For generating the Binary Matrix, all positive value entries in the Actual Matrix are as set as 1.

Generation of Forward Probabilities: The forward probability of an operator action A with respect to an alarm event C indicates the probability of co-occurrence of operator action A with alarm event C given the alarm event C. A forward probability of an operator action A with respect to an alarm event C can be calculated from the binary matrix of alarm event C as follows:

$$\text{Forward Probability} = (\text{number of time windows of alarm event } C \text{ in which the operator action } A \text{ is present})/(\text{Total number of time windows of alarm event } C) \quad \text{(Equation 3)}$$

Generation of Backward Probabilities: A backward probability of an operator action A with respect to an alarm event C indicates the probability of co-occurrence of operator action A with alarm event C given the operator action A. A backward probability of an operator action A with respect to an alarm event C can be calculated as:

$$\text{Backward Probability} = (\text{Total number of instances of operator action } A \text{ in all the time windows of alarm event } C)/(\text{Total number of instances of operator action } A \text{ in the entire log}) \quad \text{(Equation 4)}$$

If both forward and backward probability values of an operator action A with respect to an alarm event C exceed a predefined threshold value (for example, 80%) set by the operator or user then the operator action A is considered to be strongly associated with alarm event C and vice versa.

On the other hand, if for an alarm event C there is no associated operator action with forward probability value greater than or equal to a pre-defined threshold value (for example, 10%) set by the operator or user, then the alarm event C is considered as an alarm with no consistent operator action.

Calculation of Median Time Difference and Median Absolute Deviation (MAD) from Median Time Difference: For all the associated operator actions of an alarm event C that satisfy the predefined criteria for forward and backward probabilities, both a Median Time Difference and a Median Absolute Deviation (MAD) from Median Time Difference of the operator actions from the alarm event C are calculated based on the Time Difference Matrix.

After identifying all the associated operator actions for an alarm event C, associated actions are sorted in ascending order based on their Median Time difference value from the alarm event C. This provides a sequence of operator actions associated with an alarm with the Median time difference value between them.

Figure 28:
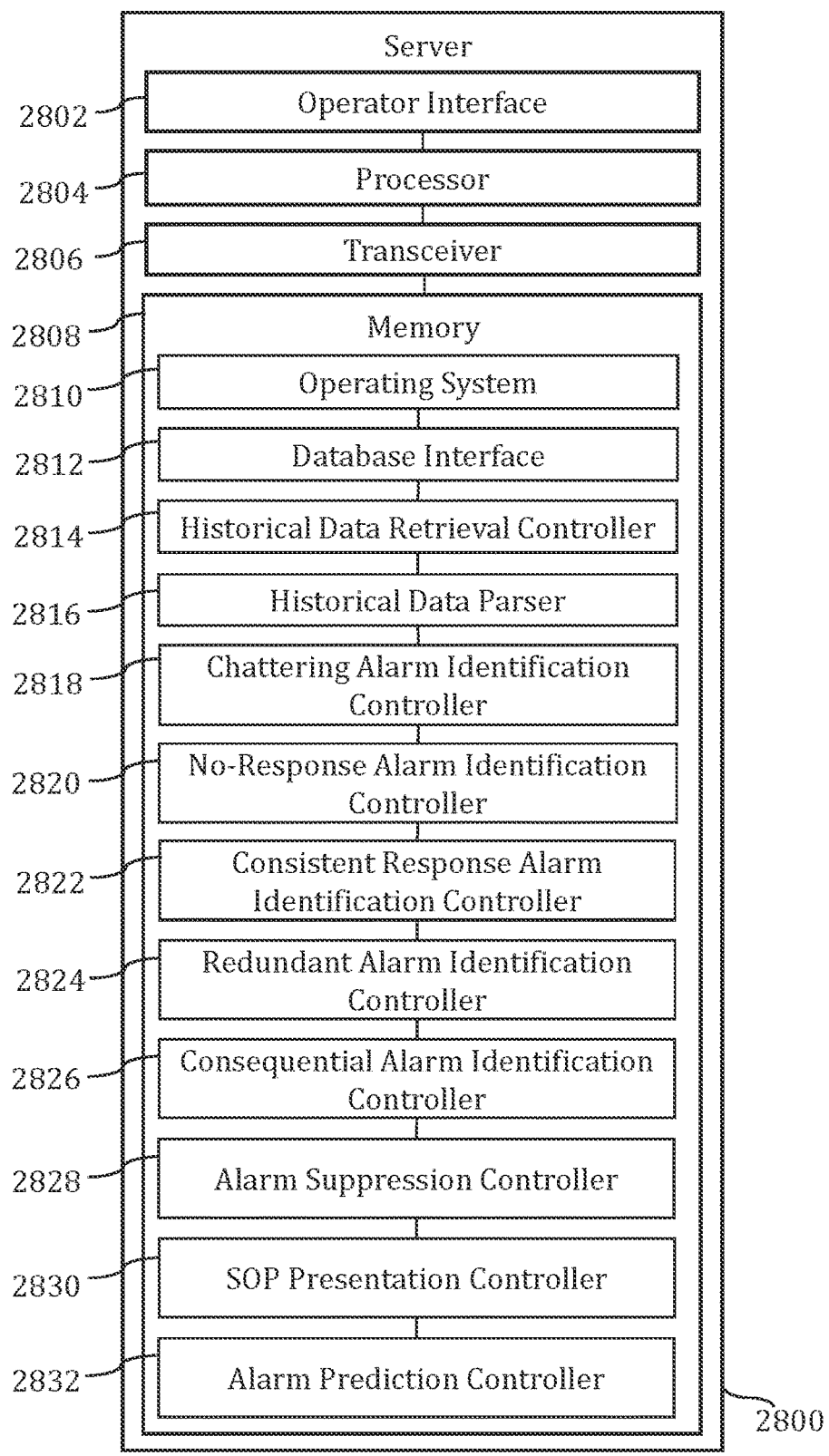
FIG. 28 illustrates a server configured in accordance with the teachings of at least one example embodiment, of a kind that may be implemented within a process control system or alarm system.

FIG. 28 illustrates a server 2800 configured in accordance with the teachings of at least one example embodiment, of a kind that may be implemented within a process control system or alarm system.

Server 2800 comprises one or more processor implemented servers that may be part of a process control system or an alarm system and that has been configured to implement one or more methods of at least one example embodiment.

Server 2800 may include (i) an operator interface 2802 to enable control instructions to be input by, and output data to be presented to, an operator of a process control system or alarm system, (ii) a processor 2804 configured for data processing operations within server 2800, (iii) a transceiver 2806 configured for enabling transmission and receipt of data network based messages at server 2800, and (iv) a memory 2808, which memory 2808 may include transitory memory and/or non-transitory memory.

In an embodiment, memory 2808 may have stored therewithin, (i) an operating system 2810 configured for managing device hardware and software resources and that provides common services for software programs implemented within server 2800, (ii) a database interface 2812 configured to enable server 2800 to retrieve data from and store data in a database that is communicably coupled with server 2800, (iii) a historical data retrieval controller 2814 configured to enable server 2800 to retrieve from one or more databases, historical data comprising one or more of alarm data, event data and/or alarm and event data logs (for example, for the purposes of implementing the method of FIG. 5A), (iv) a historical data parser 2816 configured to enable server 2800 to parse retrieved historical data (for example, for implementing one or more of the steps of the method of FIG. 5A), (v) a chattering alarm identification controller 2818 configured for identification of chattering alarm data or chattering alarm events based on the retrieved historical data (for example, for implementing method steps 504A and 506A of FIG. 5A and/or any one or more of the method steps of FIG. 6), (vi) a no-response alarm identification controller 2820, configured to enable server 2800 to identify within the retrieved historical data, alarm events that do not correspond with an operator response (for example, for implementing one or more of the method steps of FIG. 8), (vii) a consistent response alarm identification controller 2822 configured to enable server 2800 to identify within the retrieved historical data, alarm events that consistently correspond with an operator response (for example, for implementing one or more of the method steps of FIG. 9), (viii) a redundant alarm identification controller 2824 configured to enable server 2800 to identify within the retrieved historical data, one or more clusters of redundant alarm events (for example, for implementing one or more of the method steps of FIG. 11 or FIG. 12) (ix) a consequential alarm identification controller 2826 configured to enable server 2800 to identify within the retrieved historical data, one or more clusters of consequential alarm events (for example, for implementing one or more of the method steps of FIG. 14 or FIG. 15), (x) an alarm suppression controller 2828 configured to enable server 2800 to suppress one or more alarms (for example, for implementing one or more of the alarm event pattern responses that have been associated with corresponding alarm event patterns, as described in any of the method steps of FIGS. 5A, 5B, 8 and/or 11), (xi) an SOP presentation controller 2830 configured to enable server 2800 to present an operator with standardized operating procedures in response to detection of one or more detected alarm events or alarm event patterns (for example, for implementing one or more of the method steps of FIG. 9), and (xii) an alarm prediction controller 2832 configured to enable server 2800 to present an operator with information predicting an occurrence of one or more alarm events prior to said alarm events being detected or arising (for example, for implementing one or more method steps of FIG. 14).

Figure 29:
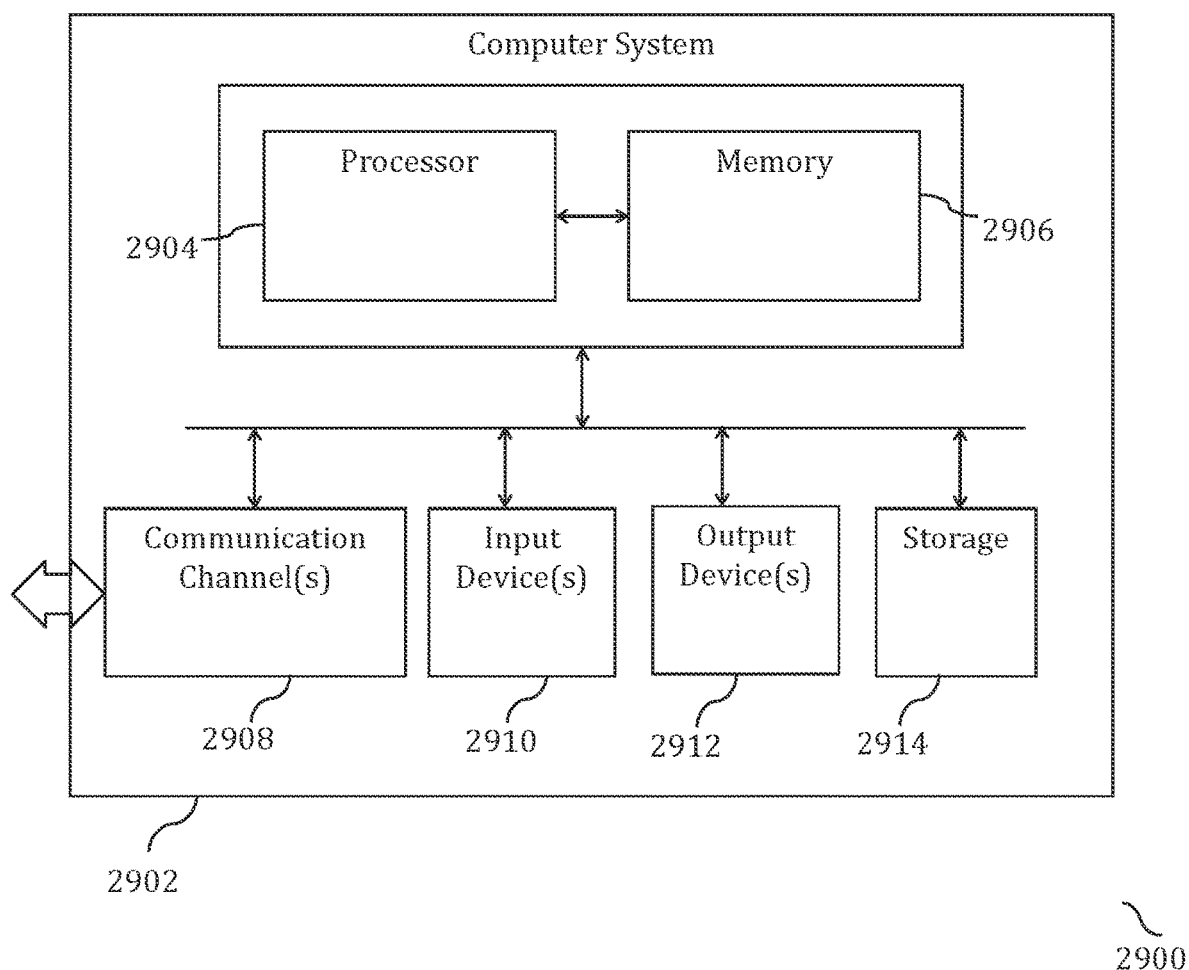
FIG. 29 illustrates an exemplary computer system according to which various embodiments of at least one example embodiment may be implemented.

FIG. 29 illustrates an exemplary computer system 2900 according to which various embodiments may be implemented.

System 2900 includes computer system 2902 which in turn comprises one or more processors 2904 and at least one memory 2906. Processor 2904 is configured to execute program instructions—and may be a real processor or a virtual processor. It will be understood that computer system 2902 does not suggest any limitation as to scope of use or functionality of described embodiments. The computer system 2902 may include, but is not be limited to, one or more of a general-purpose computer, a programmed microprocessor, a micro-controller, an integrated circuit, and other devices or arrangements of devices that are capable of implementing the steps that constitute the method of at least one example embodiment. Exemplary embodiments of a computer system 2902 may include one or more servers, desktops, laptops, tablets, smart phones, mobile phones, mobile communication devices, tablets, phablets and personal digital assistants. In an embodiment, the memory 2906 may store software for implementing various embodiments. The computer system 2902 may have additional components. For example, the computer system 2902 may include one or more communication channels 2908, one or more input devices 2910, one or more output devices 2912, and storage 2914. An interconnection mechanism (not shown) such as a bus, controller, or network, interconnects the components of the computer system 2902. In various embodiments, operating system software (not shown) provides an operating environment for various software executing in the computer system 2902 using a processor 2904, and manages different functionalities of the components of the computer system 2902.

The communication channel(s) 2908 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 2910 may include, but is not limited to, a touch screen, a keyboard, mouse, pen, joystick, trackball, a voice device, a scanning device, or any another device that is capable of providing input to the computer system 2902. In an embodiment, the input device(s) 2910 may be a sound card or similar device that accepts audio input in analog or digital form. The output device(s) 2912 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 2902.

The storage 2914 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 2902. In various embodiments, the storage 2914 may contain program instructions for implementing any of the described embodiments.

In an embodiment, the computer system 2902 is part of a distributed network or a part of a set of available cloud resources.

At least one example embodiment may be implemented in numerous ways including as a system, a method, or a computer program product such as a computer readable storage medium or a computer network wherein programming instructions are communicated from a remote location.

Inventive concepts may suitably be embodied as a computer program product for use with the computer system 2902. The method described herein is typically implemented as a computer program product, comprising a set of program instructions that is executed by the computer system 2902 or any other similar device. The set of program instructions may be a series of computer readable codes stored on a tangible medium, such as a computer readable storage medium (storage 2914), for example, diskette, CD-ROM ROM, flash drives or hard disk, or transmittable to the computer system 2902, via a modem or other interface device, over either a tangible medium, including but not limited to optical or analogue communications channel(s) 2908. The implementation of inventive concepts as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

In view of FIGS. 1-29 and related text above, it should be appreciated that inventive concepts provide a method that includes identifying an alarm event pattern within a log of alarm events that occur within a process control system, determining that a current alarm event within the process control system belongs to the alarm event pattern, determining one or more actions for resolving the current alarm event based on the alarm event pattern, and implementing the one or more actions to resolve the current alarm event. The alarm event pattern may be identified by identifying a first occurrence of a first alarm event within the log of alarm events, assigning a time window to the first occurrence of the first alarm event, identifying a first occurrence of a second alarm event that falls within the time window, performing one or more operations to calculate at least one probability value for the time window, and determining whether to associate the first and second alarm events with one another based on the at least one probability value calculated for the time window.

In one embodiment, the at least one probability value includes a forward probability value and a backward probability value. The first and second alarm events are determined to be associated with one another when the forward probability value exceeds a first threshold probability value and the backward probability value exceeds a second threshold probability value. As may be appreciated, the first threshold probability value is the same as or different from the second threshold probability value.

In one embodiment, the one or more operations includes determining a number of occurrences of the second alarm event within each time window of a plurality of time windows assigned to occurrences of the first alarm event, assigning a binary value to the number of occurrences of the second alarm event within each time window of the plurality of time windows, and calculating the at least one probability value based on the binary value.

In one embodiment, the one or more operations includes determining a first time difference between the first occurrence of the first alarm event and the first occurrence of the second alarm event within the time window, determining a second time difference between a second occurrence of the first alarm event and a second occurrence of the second alarm event within another time window assigned to the second occurrence of the first alarm event, retrieving a first time stamp of the first occurrence of the second alarm event within the time window, retrieving a second time stamp of the second occurrence of the second alarm event within the another time window assigned to the second occurrence of the first alarm event, and calculating the at least one probability based on at least one matrix that is created using the first time stamp and the second time stamp.

The method may include rendering, to a display, an ordered sequence of all associated alarms of the first alarm event that occur during the time window and the another time window. The method may further include removing unwanted alarm events from the log of alarm events prior to identifying the alarm event pattern. In one embodiment, the unwanted alarm events comprise one or more of chattering alarm events, repeating alarm events, or fleeting alarm events.

Determining the one or more actions for resolving the current alarm event based on the alarm event pattern may include identifying occurrences of a first alarm event within the log of alarm events, assigning time windows to the occurrences of the first alarm event based on notification times and recovery times of the occurrences, identifying operator actions within each time window, performing one or more operations to calculate at least one probability value for the time windows, and determining whether to associate the operator actions and the first alarm event with one another based on the at least one probability value calculated for the time windows.

In one embodiment, the at least one probability value includes a forward probability value and a backward probability value. The first alarm event and an operator action are determined to be associated with one another when the forward probability value exceeds a first threshold probability value and the backward probability value exceeds a second threshold probability value. As may be appreciated, the first threshold probability value is the same as or different from the second threshold probability value.

The one or more operations may include determining a number of occurrences of the operator actions within each time window, assigning binary values to the number of occurrences of the operator actions within each time window, and calculating the at least one probability value based on the binary values.

The one or more operations may include determining a first time difference between a first occurrence of an operator action and a notification of the first alarm event within a first time window, determining a second time difference between a second occurrence of the operator action and a second occurrence of the first alarm event within a second time window, retrieving a first time stamp of the first occurrence of the operator action within the first time window, retrieving a second time stamp of the second occurrence of the operator action within the second time window, and calculating the at least one probability based on at least one matrix that is created using the first time stamp and the second time stamp.

The method may include rendering, to a display, an ordered sequence of the operator actions that are determined to be associated with the first alarm event.

At least one embodiment is directed to a device comprising processing circuitry configured to identify an alarm event pattern within a log of alarm events that occur within a process control system, determine that a current alarm event within the process control system belongs to the alarm event pattern, determine one or more operator actions for resolving the current alarm event based on the alarm event pattern, and generate a control signal that causes the process control system to implement the one or more operator actions to resolve the current alarm event. The processing circuitry may be configured to remove unwanted alarm events from the log of alarm events prior to identifying the alarm event pattern. The unwanted alarm events may comprise one or more of chattering alarm events.

In one embodiment, the alarm event pattern includes alarm events with no operator actions, alarm events with consistent operator actions, groups of redundant alarm events, groups of consequential alarm events, or any combination thereof.

At least one example embodiment is directed to a system that comprises an output device and processing circuitry configured to identify an alarm event pattern within a log of alarm events that occur within a process control system, determine that a current alarm event within the process control system belongs to the alarm event pattern, determine one or more operator actions for resolving the current alarm event based on the alarm event pattern, and render, to the output device, an ordered sequence of the operator actions that resolve the current alarm event.

Based on the above, it would be apparent that inventive concepts offer significant advantages—in particular, by providing efficient solutions for alarm rationalization, alarm prediction and alarm handling, including intelligent alarm suppression, elimination of nuisance alarms, alarm event pattern recognition, elimination or reduction of redundant alarms, and predictive handling of alarm events that enable an operator to take preventive steps in connection with one or more alarm states even before the alarm states are detected or before an alarm event is triggered.

While the exemplary embodiments are described and illustrated herein, it will be appreciated that they are merely illustrative. It will be understood by those skilled in the art that various modifications in form and detail may be made therein without departing from or offending the spirit and scope of the inventive concepts as defined above and by the appended claims. Additionally, embodiments illustratively disclosed herein suitably may be practiced in the absence of any element which is not specifically disclosed herein—and in a particular embodiment that is specifically contemplated, inventive concepts are intended to be practiced in the absence of any one or more element which are not specifically disclosed herein.

It is claimed:

1. A method, comprising:
identifying an alarm event pattern within a log of alarm events that occur within a process control system;
determining that a current alarm event within the process control system belongs to the alarm event pattern;
determining one or more actions for resolving the current alarm event based on the alarm event pattern; and
implementing the one or more actions to resolve the current alarm event,
wherein the alarm event pattern is identified by:
identifying a first occurrence of a first alarm event within the log of alarm events;
assigning a time window to the first occurrence of the first alarm event;
identifying a first occurrence of a second alarm event that falls within the time window;
performing one or more operations to calculate at least one probability value for the time window; and
determining whether the first and second alarm events are associated with one another as at least part of the alarm event pattern based on the at least one probability value calculated for the time window.

2. The method of claim 1, wherein the at least one probability value includes a forward probability value and a backward probability value, and wherein the first and second alarm events are determined to be associated with one another when the forward probability value exceeds a first threshold probability value and the backward probability value exceeds a second threshold probability value.

3. The method of claim 2, wherein the first threshold probability value is the same as or different from the second threshold probability value.

4. The method of claim 1, wherein the one or more operations to calculate the at least one probability value for the time window include:
determining a number of occurrences of the second alarm event within each time window of a plurality of time windows assigned to occurrences of the first alarm event;
assigning a binary value to the number of occurrences of the second alarm event within each time window of the plurality of time windows; and
calculating the at least one probability value based on the binary value.

5. The method of claim 1, wherein the one or more operations to calculate the at least one probability value for the time window include:
determining a first time difference between the first occurrence of the first alarm event and the first occurrence of the second alarm event within the time window;
determining a second time difference between a second occurrence of the first alarm event and a second occurrence of the second alarm event within another time window assigned to the second occurrence of the first alarm event;
retrieving a first time stamp of the first occurrence of the second alarm event within the time window;
retrieving a second time stamp of the second occurrence of the second alarm event within the another time window assigned to the second occurrence of the first alarm event; and
calculating the at least one probability based on at least one matrix that is created using the first time stamp and the second time stamp.

6. The method of claim 5, further comprising:
rendering, to a display, an ordered sequence of all associated alarms of the first alarm event that occur during the time window and the another time window.

7. The method of claim 1, further comprising:
removing unwanted alarm events from the log of alarm events prior to identifying the alarm event pattern.

8. The method of claim 7, wherein the unwanted alarm events comprise one or more of chattering alarm events, repeating alarm events, or fleeting alarm events.

9. The method of claim 1, wherein determining the one or more actions for resolving the current alarm event based on the alarm event pattern comprises:
identifying occurrences of a third alarm event within the log of alarm events;
assigning second time windows to the occurrences of the third alarm event based on notification times and recovery times of the occurrences;
identifying operator actions within each second time window;
performing one or more operations to calculate at least one probability value for the second time windows; and
determining whether the operator actions and the third alarm event are associated with one another as at least part of a solution for resolving the current alarm event based on the at least one probability value calculated for the second time windows.

10. The method of claim 9, wherein the at least one probability value includes a forward probability value and a backward probability value, and wherein the third alarm event and an operator action are determined to be associated with one another when the forward probability value exceeds a first threshold probability value and the backward probability value exceeds a second threshold probability value.

11. The method of claim 10, wherein the first threshold probability value is the same as or different from the second threshold probability value.

12. The method of claim 9, wherein the one or more operations to calculate the at least one probability value for the second time windows include:
determining a number of occurrences of the operator actions within each second time window;
assigning binary values to the number of occurrences of the operator actions within each second time window; and
calculating the at least one probability value based on the binary values.

13. The method of claim 9, wherein the one or more operations to calculate the at least one probability value for the second time windows include:
determining a first time difference between a first occurrence of an operator action and a notification of the third alarm event within a certain second time window;
determining a second time difference between a second occurrence of the operator action and a second occurrence of the third alarm event within another second time window;
retrieving a first time stamp of the first occurrence of the operator action within the certain second time window;
retrieving a second time stamp of the second occurrence of the operator action within the another second time window; and
calculating the at least one probability for the second time windows based on at least one matrix that is created using the first time stamp and the second time stamp.

14. The method of claim 13, further comprising:
rendering, to a display, an ordered sequence of the operator actions that are determined to be associated with the third alarm event.

15. A device, comprising:
processing circuitry configured to:
identify an alarm event pattern within a log of alarm events that occur within a process control system;
determine that a current alarm event within the process control system belongs to the alarm event pattern;
determine one or more operator actions for resolving the current alarm event based on the alarm event pattern; and
generate a control signal that causes the process control system to implement the one or more operator actions to resolve the current alarm event,
wherein determining the one or more operator actions for resolving the current alarm event based on the alarm event pattern comprises:
identifying occurrences of a first alarm event within the log of alarm events;
assigning time windows to the occurrences of the first alarm event based on notification times and recovery times of the occurrences;
identifying operator actions within each time window;
performing one or more operations to calculate at least one probability value for the time windows; and
determining whether to associate the operator actions and the first alarm event with one another based on the at least one probability value calculated for the time windows.

16. The device of claim 15, wherein the processing circuitry is configured to remove unwanted alarm events from the log of alarm events prior to identifying the alarm event pattern.

17. The device of claim 16, wherein the unwanted alarm events comprise one or more of chattering alarm events.

18. The device of claim 17, wherein the alarm event pattern includes alarm events with no operator actions, alarm events with consistent operator actions, groups of redundant alarm events, groups of consequential alarm events, or any combination thereof.

19. A system, comprising:
an output device; and
processing circuitry configured to:
identify an alarm event pattern within a log of alarm events that occur within a process control system;
determine that a current alarm event within the process control system belongs to the alarm event pattern;
determine one or more operator actions for resolving the current alarm event based on the alarm event pattern; and
render, to the output device, an ordered sequence of the operator actions that resolve the current alarm event,
wherein the alarm event pattern is identified by:
identifying a first occurrence of a first alarm event within the log of alarm events;
assigning a time window to the first occurrence of the first alarm event;
identifying a first occurrence of a second alarm event that falls within the time window;
performing one or more operations to calculate at least one probability value for the time window; and
determining whether to associate the first and second alarm events with one another as at least part of the alarm event pattern based on the at least one probability value calculated for the time window.

* * * * *